United States Patent
Matsuo et al.

(10) Patent No.: US 10,679,598 B2
(45) Date of Patent: Jun. 9, 2020

(54) POLYMER RESIN FILM, AND AIR-PERMEABLE MEMBRANE, SOUND-PERMEABLE MEMBRANE, ACOUSTIC RESISTOR, AIR-PERMEABLE MEMBRANE MEMBER, SOUND-PERMEABLE MEMBRANE MEMBER, ACOUSTIC RESISTOR MEMBER, AND AUDIO DEVICE THAT INCLUDE THE POLYMER RESIN FILM, AND METHOD FOR PRODUCING THE POLYMER RESIN FILM

(71) Applicant: NITTO DENKO CORPORATION, Osaka (JP)

(72) Inventors: Naoyuki Matsuo, Osaka (JP); Satoru Furuyama, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 315 days.

(21) Appl. No.: 15/569,573

(22) PCT Filed: Apr. 26, 2016

(86) PCT No.: PCT/JP2016/002208
§ 371 (c)(1),
(2) Date: Oct. 26, 2017

(87) PCT Pub. No.: WO2016/174871
PCT Pub. Date: Nov. 3, 2016

(65) Prior Publication Data
US 2018/0315409 A1    Nov. 1, 2018

(30) Foreign Application Priority Data

Apr. 30, 2015 (JP) ................... 2015-093095

(51) Int. Cl.
*G10K 11/00* (2006.01)
*C08J 9/00* (2006.01)
(Continued)

(52) U.S. Cl.
CPC ............ *G10K 11/002* (2013.01); *B32B 3/266* (2013.01); *B32B 27/36* (2013.01); *C08J 9/00* (2013.01); *H04R 1/086* (2013.01); *B32B 2307/10* (2013.01)

(58) Field of Classification Search
CPC ....... G10K 11/002; B32B 3/266; B32B 27/36; B32B 2307/10; H04R 1/086; C08J 9/00
(Continued)

(56) References Cited

U.S. PATENT DOCUMENTS 5,286,279 A * 2/1994 Wu ....................... B01D 53/228
428/308.4
6,512,834 B1 * 1/2003 Banter ................... H04R 1/086
381/189

(Continued)

FOREIGN PATENT DOCUMENTS

EP    3 264 788 A1    3/2018
EP    3 264 790 A1    3/2018

(Continued)

OTHER PUBLICATIONS

International Search Reporting from Application No. PCT/JP2016/002208, dated Aug. 9, 2016.

(Continued)

*Primary Examiner* — Jeremy A Luks
(74) *Attorney, Agent, or Firm* — Greenblum & Bernstein, P.L.C.

(57) ABSTRACT

A polymer resin film of the present disclosure has a plurality of through holes extending through the thickness of the polymer resin film. The through holes penetrate a substrate (Continued)

structure of the resin film. The through holes have openings formed in both a first principal surface and a second principal surface of the film. The through holes have a shape in which the area of a cross-section perpendicular to a direction in which the through holes extend is constant from the first principal surface of the film to the second principal surface of the film or increases from the first principal surface toward the second principal surface. The openings in the first principal surface have a diameter of 3 μm or more and 80 μm or less. A variation in a porosity defined by the openings in the first principal surface is 10% or less.

17 Claims, 7 Drawing Sheets

(51) Int. Cl.
  *B32B 3/26* (2006.01)
  *B32B 27/36* (2006.01)
  *H04R 1/08* (2006.01)
(58) Field of Classification Search
  USPC .............................. 181/286, 291, 293, 294
  See application file for complete search history.

(56) References Cited

U.S. PATENT DOCUMENTS

| | | | | |
|---|---|---|---|---|
| 6,932,187 | B2 * | 8/2005 | Banter | H04R 1/023 181/149 |
| 9,171,535 | B2 | 10/2015 | Abe et al. | |
| 2008/0044637 | A1 | 2/2008 | Masuda et al. | |
| 2009/0253016 | A1 | 10/2009 | Katayama | |
| 2010/0206660 | A1 * | 8/2010 | Horie | B29C 55/005 181/175 |
| 2012/0114902 | A1 | 5/2012 | Furuyama et al. | |
| 2013/0074691 | A1 | 3/2013 | Furuyama et al. | |
| 2013/0333978 | A1 | 12/2013 | Abe et al. | |
| 2015/0304767 | A1 | 10/2015 | Mori et al. | |

FOREIGN PATENT DOCUMENTS

| | | |
|---|---|---|
| JP | 2002-029169 A | 1/2002 |
| JP | 2003-318557 A | 11/2003 |
| JP | 2006-326860 A | 12/2006 |
| JP | 2007-023183 A | 2/2007 |
| JP | 2009-262216 A | 11/2009 |
| JP | 2011-016352 A | 1/2011 |
| JP | 2012-195928 A | 10/2012 |
| JP | 2013-108066 A | 6/2013 |
| JP | 2015-065639 A | 4/2015 |
| WO | 2005/070611 A1 | 8/2005 |

OTHER PUBLICATIONS

International Preliminary Report on Patentability from Application No. PCT/JP2016/002208, dated Oct. 31, 2017.

Charinee Winotapun et al., "Microperforation of Three Common Plastic Films by Laser and Their Enhanced Oxygen Transmission for Fresh Produce Packaging", Packaging technology and Science, 28, pp. 367-383, 2015.

Avanish Kr. Dubey et al., "Experimental study of Nd:YAG laser beam machining—An overview", Journal of Materials Processing Technology, 195, pp. 15-26, 2008.

European Search Report issued with respect to Application No. 16786148.3, dated Jan. 9, 2019.

* cited by examiner

POLYMER RESIN FILM, AND
AIR-PERMEABLE MEMBRANE,
SOUND-PERMEABLE MEMBRANE,
ACOUSTIC RESISTOR, AIR-PERMEABLE
MEMBRANE MEMBER,
SOUND-PERMEABLE MEMBRANE
MEMBER, ACOUSTIC RESISTOR MEMBER,
AND AUDIO DEVICE THAT INCLUDE THE
POLYMER RESIN FILM, AND METHOD
FOR PRODUCING THE POLYMER RESIN
FILM

TECHNICAL FIELD

The present invention relates to: a polymer resin film having air permeability through its thickness; and an air-permeable membrane, a sound-permeable membrane, an acoustic resistor, an air-permeable membrane member, a sound-permeable membrane member, an acoustic resistor member, and an audio device that include the polymer resin film. The present invention also relates to a method for producing the polymer resin film.

BACKGROUND ART

Polymer membranes having air permeability through their thickness are used in various applications such as use as air-permeable membranes and use as sound-permeable membranes. Polymer membranes having air permeability but not having water perviousness (water permeability) through their thickness can be used in applications requiring waterproofness, such as use as waterproof air-permeable membranes and/or waterproof sound-permeable membranes. Typical examples of the former type of polymer membranes are non-woven fabrics. Non-woven fabrics are membranes produced by entangling long fibers or short fibers without weaving. Air can pass through the thickness of non-woven fabrics via interstices between randomly entangled fibers.

Other examples of polymer membranes having air permeability through their thickness are stretched porous membranes having a structure in which a huge number of pores resulting from stretching are distributed. Patent Literature 1 discloses a waterproof air-permeable membrane consisting of a stretched porous membrane of polytetrafluoroethylene (PTFE) or ultra-high-molecular-weight polyethylene.

CITATION LIST

Patent Literature

Patent Literature 1: JP 2003-318557 A

SUMMARY OF INVENTION

Technical Problem

For polymer membranes having air permeability through their thickness, it is desirable that unevenness of the air permeability be small. In particular, a polymer membrane to be used inside an electronic device needs to have a reduced size suitable for such use, and is strongly required to be as free of air permeability unevenness as possible to improve the characteristics of the electronic device for which the membrane is responsible and improve the quality and ease of production of the electronic device. Non-woven fabrics, which allow air to pass therethrough via interstices between randomly entangled fibers, have highly uneven air permeability because of their structure. Stretched porous membranes having a structure in which a huge number of pores resulting from stretching are distributed have more even air permeability than non-woven fabrics. However, there is a demand for further reduction in air permeability unevenness.

An object of the present invention is to provide a polymer membrane that has air permeability through its thickness and in which the air permeability unevenness is smaller than in conventional membranes.

Solution to Problem

A polymer membrane according to the present invention is a polymer resin film having a plurality of through holes extending through the thickness of the polymer resin film. The through holes penetrate a substrate structure of the resin film. The through holes have openings formed in both a first principal surface and a second principal surface of the film. The through holes have a shape in which the area of a cross-section perpendicular to a direction in which the through holes extend is constant from the first principal surface of the film to the second principal surface of the film or increases from the first principal surface toward the second principal surface. The openings in the first principal surface have a diameter of 3 µm or more and 80 µm or less. A variation in a porosity defined by the openings in the first principal surface is 10% or less. A variation in the density (number/cm$^2$) of the openings in the first principal surface is 1000 openings/cm$^2$ or less.

An air-permeable membrane according to the present invention includes the above polymer resin film according to the present invention.

An air-permeable membrane member according to the present invention includes the above air-permeable membrane according to the present invention and a supporting member joined to the air-permeable membrane.

A sound-permeable membrane according to the present invention includes the above polymer resin film according to the present invention.

A sound-permeable membrane member according to the present invention includes the above sound-permeable membrane according to the present invention and a supporting member joined to the sound-permeable membrane.

An acoustic resistor according to the present invention includes the above polymer resin film according to the present invention.

An acoustic resistor member according to the present invention includes the above acoustic resistor according to the present invention and a supporting member joined to the acoustic resistor.

An audio device according to the present invention includes the above acoustic resistor according to the present invention, the audio device being an earphone set, an earphone unit, a headphone set, a headphone unit, a headset, a headset unit, a telephone receiver, a hearing aid, or a wearable terminal.

A method for producing a polymer resin film according to the present invention is a method for producing the above polymer resin film of the present invention, the method comprising irradiating an original film with a laser to form the through holes in the original film.

Advantageous Effects of Invention

The present invention makes it possible to obtain a polymer resin film that is a polymer membrane having air permeability through its thickness and in which the air permeability unevenness is smaller than in conventional membranes.

DESCRIPTION OF EMBODIMENTS

Figure 1:
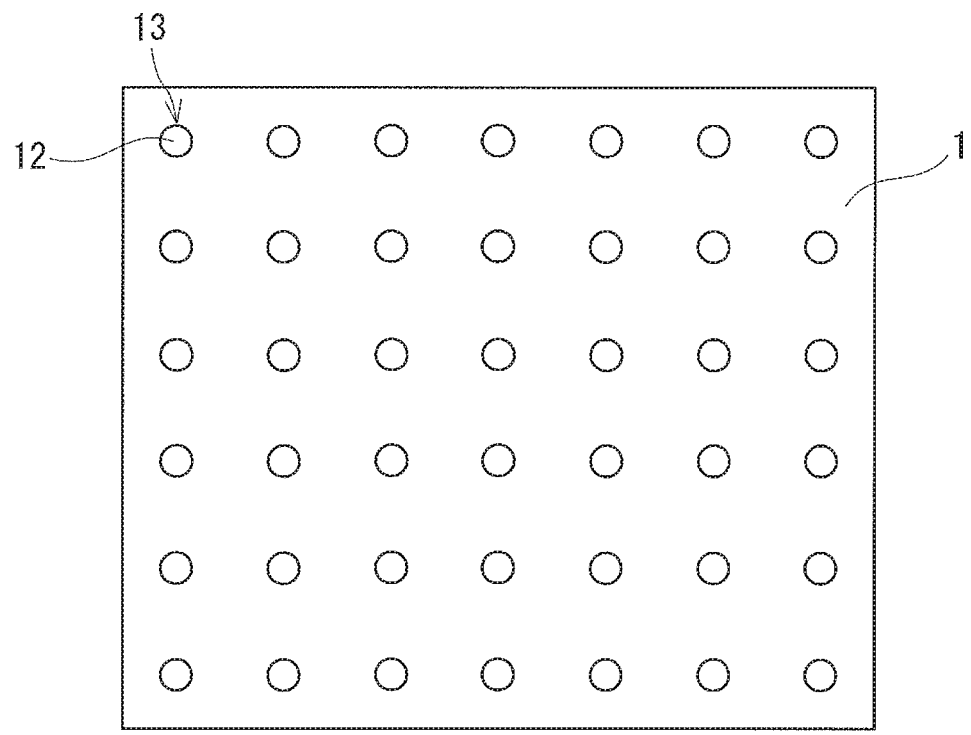
FIG. 1 is a plan view schematically showing an exemplary polymer resin film according to the present invention.

A first aspect of the present disclosure provides a polymer resin film having a plurality of through holes extending through the thickness of the polymer resin film, wherein: the through holes penetrate a substrate structure of the resin film; the through holes have openings formed in both a first principal surface and a second principal surface of the film; the through holes have a shape in which the area of a cross-section perpendicular to a direction in which the through holes extend is constant from the first principal surface of the film to the second principal surface of the film or increases from the first principal surface toward the second principal surface; the openings in the first principal surface have a diameter of 3 μm or more and 80 μm or less; a variation in a porosity defined by the openings in the first principal surface is 10% or less; and a variation in the density (number/cm$^2$) of the openings in the first principal surface is 1000 openings/cm$^2$ or less.

A second aspect of the present disclosure provides the polymer resin film as set forth in the first aspect, wherein the openings are formed independently of each other and spaced from each other in both of the principal surfaces.

A third aspect of the present disclosure provides the polymer resin film as set forth in the first or second aspect, wherein the substrate structure of the polymer resin film is non-porous.

A fourth aspect of the present disclosure provides the polymer resin film as set forth in any one of the first to third aspects, wherein an air permeability through the thickness of the polymer resin film is 1 cm$^3$/(cm$^2$·sec) or more and 150 cm$^3$/(cm$^2$·sec) or less in terms of Frazier number measured according to JIS L 1096.

A fifth aspect of the present disclosure provides the polymer resin film as set forth in any one of the first to fourth aspects, wherein a variation in the air permeability through the thickness of the polymer resin film is 8% or less.

A sixth aspect of the present disclosure provides the polymer resin film as set forth in any one of the first to fifth aspects, wherein a sound pressure loss at a frequency of 5 kHz is 5 dB or less when the polymer resin film has an effective area of 4.9 mm$^2$.

A seventh aspect of the present disclosure provides the polymer resin film as set forth in any one of the first to sixth aspects, wherein the porosity of the first principal surface is 0.5 to 50%.

An eighth aspect of the present disclosure provides the polymer resin film as set forth in any one of the first to seventh aspects, wherein, in both of the principal surfaces, the openings of the through holes are formed at positions corresponding to intersections of an imaginary grid defined on each of the principal surfaces.

A ninth aspect of the present disclosure provides the polymer resin film as set forth in any one of the first to eighth aspects, wherein the polymer resin film is subjected to a liquid-repellent treatment.

A tenth aspect of the present disclosure provides an air-permeable membrane including the polymer resin film as set forth in any one of the first to ninth aspects.

An eleventh aspect of the present disclosure provides an air-permeable membrane member including the air-permeable membrane as set forth in the tenth aspect and a supporting member joined to the air-permeable membrane.

A twelfth aspect of the present disclosure provides a sound-permeable membrane including the polymer resin film as set forth in any one of the first to ninth aspects.

A thirteenth aspect of the present disclosure provides a sound-permeable membrane member including the sound-permeable membrane as set forth in the twelfth aspect and a supporting member joined to the sound-permeable membrane.

A fourteenth aspect of the present disclosure provides an acoustic resistor including the polymer resin film as set forth in any one of the first to ninth aspects.

A fifteenth aspect of the present disclosure provides an acoustic resistor member including the acoustic resistor as set forth in the fourteenth aspect and a supporting member joined to the acoustic resistor.

A sixteenth aspect of the present disclosure provides an audio device including the acoustic resistor as set forth in the fourteenth aspect, the audio device being an earphone set, an earphone unit, a headphone set, a headphone unit, a headset, a headset unit, a telephone receiver, a hearing aid, or a wearable terminal.

A seventeenth aspect of the present disclosure provides a method for producing the polymer resin film as set forth in any one of the first to ninth aspects, the method comprising irradiating an original film with a laser to form the through holes in the original film.

[Polymer Resin Film]

Figure 2:
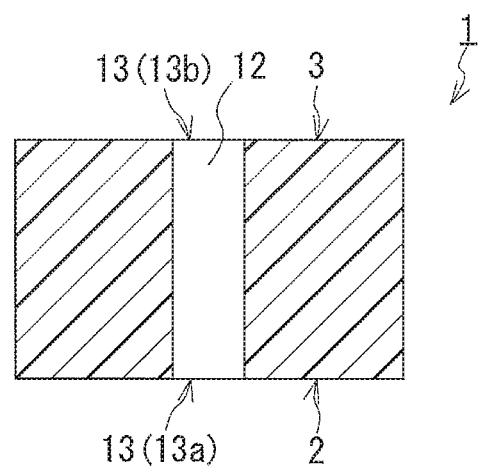
FIG. 2 is a cross-sectional view schematically showing an example of the through holes of the polymer resin film according to the present invention.

FIGS. 1 and 2 show an example of the polymer resin film according to the present invention. FIG. 2 shows a cross-section of the polymer resin film 1 of FIG. 1, and the cross-section includes a through hole 12. As shown in FIGS. 1 and 2, the resin film 1 has a plurality of through holes 12 extending through the thickness of the resin film 1. The through holes 12 extend straight, and the area of their cross-section perpendicular to the direction in which they extend is substantially constant from a first principal surface 2 of the resin film 1 to a second principal surface 3 of the resin film 1. In the example shown in FIGS. 1 and 2, the through holes 12 have openings 13 (13a and 13b) in both of the principal surfaces 2 and 3 of the resin film. The openings 13 are formed independently of each other and spaced from each other. The through holes 12 pierce a substrate structure of the resin film 1. In other words, the through holes 12 have a different structure from the substrate of the resin film 1. In the example shown in FIGS. 1 and 2, the resin film 1 is a non-porous film having no passage that allows through-thickness air permeation other than the through holes 12, and is typically an imperforate (solid) film except for the through holes 12. That is, the substrate structure of the resin film 1 shown in FIGS. 1 and 2 is non-porous, and the through holes 12 penetrate this non-porous structure. The diameter of the through holes 12 in the first principal surface 2 of the resin film 1 is 3 µm or more and 80 µm or less. A porosity of the first principal surface 2 can be defined by the openings 13a of the through holes 12. A variation in the porosity is 10% or less. A variation in the density (number/cm$^3$) of the openings 13a in the first principal surface 2 is 1000 openings/cm$^2$ or less.

Figure 3:
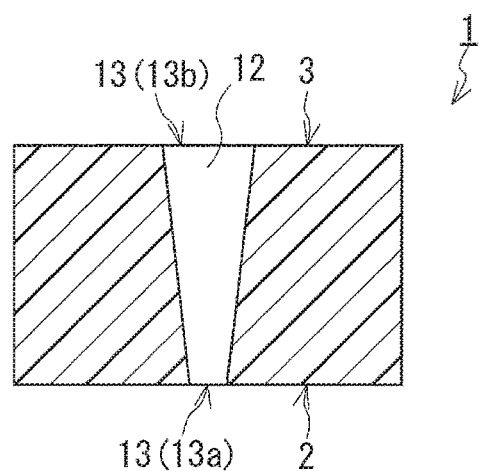
FIG. 3 is a cross-sectional view schematically showing another example of the through holes of the polymer resin film according to the present invention.

The through holes 12 may have a shape in which the area of a cross-section perpendicular to the direction in which the through holes 12 extend increases from the first principal surface 2 of the resin film 1 toward the second principal surface 3 of the resin film 1 (see FIG. 3). Such through holes 12 have a shape that is asymmetric across the thickness of the resin film 1 and in which the cross-section varies in the direction in which the through holes 12 extend. In this case, the diameter of the openings 13a of the through holes 12 in the first principal surface 2 is relatively small, while the diameter of the openings 13b of the through holes 12 in the second principal surface 3 is relatively large. Also in this case, the diameter of the through holes 12 in the first principal surface 2 of the resin film 1 is 3 µm or more and 80 µm or less, and the variation in the porosity of the first principal surface 2 is 10% or less, and the variation in the density of the openings 13a in the first principal surface 2 is 1000 openings/cm$^2$ or less. The area of the above cross-section may increase continuously from the first principal surface 2 toward the second principal surface 3 or may increase stepwise from the first principal surface 2 toward the second principal surface 3 (this means that there may be a region where the area is constant). In an embodiment, the area of the cross-section increases continuously, and the rate of the increase is constant or substantially constant. The production method described below is capable of forming the resin film 1 having the through holes 12 in which the area of the cross-section increases continuously from the first principal surface 2 toward the second principal surface 3 and in which the rate of the increase is constant or substantially constant.

Such a structure of the resin film 1 is distinctively different from those of conventional polymer membranes. For example, non-woven fabrics allow air to pass therethrough via interstices between randomly entangled fibers. Stretched porous membranes have a huge number of pores three-dimensionally distributed over the entire membranes and connected to each other, and these pores act as air passages. By contrast, the resin film 1 has a structure as described above. Thus, the resin film 1 is embodied as a polymer membrane that has air permeability through its thickness and in which air permeability unevenness is smaller than in conventional membranes.

In a resin film 1, the through holes 12 are formed to penetrate the substrate structure of the resin film 1. Thus, various factors such as the shape of the through holes 12 (including the cross-sectional shape and the manner of change in cross-sectional area), the diameters of the through holes 12 (the diameters of the openings 13a and 13b), and the density of the openings 13a in the principal surface 2 can be more accurately and uniformly controlled. This contributes to the small air permeability unevenness of the resin film 1 and also contributes to high flexibility in controlling the characteristics of the resin film 1 in accordance with the intended application of the resin film 1 and therefore, for example, to improvement in the characteristics of the resin film 1. Conventional polymer membranes cannot allow accurate or uniform control of the above factors because of their structure and therefore cannot offer such high flexibility in characteristics control as provided by the resin film 1. The term "high flexibility in characteristics control" includes, for example, high flexibility in controlling the air permeability of an air-permeable membrane, high flexibility in controlling the sound permeability of a sound-permeable membrane, high flexibility in controlling the waterproofness and air permeability of a waterproof air-permeable membrane, high flexibility in controlling the waterproofness and sound permeability of a waterproof sound-permeable membrane, and high flexibility in controlling the characteristics of sound passing through an acoustic resistor. More specifically, the term "high flexibility in characteristics control" includes achievement of high air permeability, achievement of high sound permeability, achievement of high levels of both waterproofness and air permeability, achievement of high levels of both waterproofness and sound permeability, and achievement of high controllability of the dustproofness of an acoustic resistor and the characteristics of sound passing through the resistor.

Saying that "the area of the cross-section is substantially constant" (or "the area of the cross-section does not change") in the through holes 12 does not necessarily mean that the area of the cross-section should be exactly constant. Some variation in the area of the cross-section inevitably caused due to the nature of the production method of the resin film 1 is acceptable.

In the resin film 1, the diameter of the openings 13a of the through holes 12 in the first principal surface 2 is 3 µm or more and 80 µm or less. When the diameter of the openings 13a is within this range, there is an increase in the effect of reducing the air permeability unevenness of the resin film 1 as compared to conventional membranes having an average hole diameter similar to the diameter of the openings 13a. When the diameter of the openings 13a is within this range, the flexibility in controlling the characteristics of the resin film 1 increases; specifically, for example, the characteristics of the resin film 1 can be improved. The characteristics of the resin film 1 include, for example, at least one selected from the air permeability, the sound permeability (evaluated, for example, by insertion loss of sound pressure caused by the resin film 1), the waterproofness, the dustproofness, and the characteristics of sound passing through the resin film 1. It is not necessarily the case that all of these characteristics improve together. In addition, the intended application of the resin film 1 does not necessarily require all of these characteristics or improvement of all of these characteristics. If the diameter of the openings 13a of the through holes 12 is larger than 80 μm, for example, the dustproofness of the resin film 1 deteriorates.

The diameter of the openings 13a of the through holes 12 in the first principal surface 2 is preferably 10 μm or more and 50 μm or less and more preferably 15 μm or more and 30 μm or less. The preferred range of the diameter varies depending on the specific application of the resin film 1. For example, when the resin film 1 is used as a waterproof air-permeable membrane or a waterproof sound-permeable membrane, the upper limit of the diameter may be, for example, 15 μm or less, preferably 14 μm or less, and more preferably 10 μm or less, to achieve sufficient waterproofness. When no waterproofness is required, the lower limit of the diameter of the openings 13a of the through holes 12 in the first principal surface 2 may be 10 μm or more or may be 20 μm or more to increase the ease of production of the resin film 1.

The diameter of the openings 13a of the through holes 12 in the first principal surface 2 is different in concept from the average hole diameter of the first principal surface 2. In the resin film 1, the diameters of the openings 13a of all of the through holes 12 present in the first principal surface 2 or the diameters of the openings 13a of all of the through holes 12 present in that portion of the first principal surface 2 which lies within the effective region of the resin film 1 (the region usable for the intended application of the film) are within the range described above.

The shape of the above-described cross-section of the through holes 12 and the shape of the openings 13 are not particularly limited and are, for example, circular or elliptical. In this case, the shapes need not be exactly circular or elliptical and, for example, some degree of shape distortion inevitably caused due to the nature of the production method described below is acceptable. When the shapes are circular or elliptical and the area of the cross-section increases from the first principal surface 2 toward the second principal surface 3 at a constant rate or at a substantially constant rate, the shape of the through holes 12 corresponds to the whole or a part of a circular cone or elliptical cone. The production method described below is capable of forming the resin film 1 having such through holes 12.

The diameter of an opening 13 of a through hole 12 is determined as the diameter of a circle on the assumption that the opening 13 has the shape of the circle. That is, the diameter of the opening 13 is defined as corresponding to the diameter of a circle having an area equal to the cross-sectional area (opening area) of the opening 13. The diameters of the openings 13a of the through holes 12 in the first principal surface 2 of the resin film 1 need not be exactly equal for all of the openings 13a lying in the principal surface 2. However, it is preferable for the diameters in the effective region of the resin film 1 to be so uniform that the diameters can be considered substantially equal (e.g., the standard deviation is 10% or less of the average). The production method described below is capable of forming the resin film 1 in which the openings 13a have such uniform diameters.

Depending on the production method of the resin film 1, "burrs" may be formed around the openings 13 in the principal surface 2 and/or principal surface 3. The characteristics of the resin film 1 which are related to the openings 13, such as the diameters of the openings 13, are determined solely on the basis of the openings 13 themselves without consideration of the burrs.

In the resin film 1, a variation in a porosity defined by the openings 13a in the first principal surface 2 is 10% or less. When the variation in the porosity of the first principal surface 2 is within this range, there is an increase in the effect of reducing the air permeability unevenness of the resin film 1 as compared to conventional membranes. Additionally, when the variation in the porosity of the first principal surface 2 is within this range, the flexibility in controlling the characteristics of the resin film 1 increases; specifically, for example, the characteristics of the resin film 1 can be improved. The porosity of a principal surface of the resin film 1 can be determined as the ratio of the sum of the areas of the openings 13 of all of the through holes 12 present in the principal surface to the area of the principal surface. The variation in the porosity of the first principal surface 2 can be 8% or less or even 5% or less.

In the resin film 1, a variation in the density of the openings 13a in the first principal surface 2 is 1000 openings/cm$^2$ or less. When the variation in the density of the openings 13a in the first principal surface 2 is within this range, there is an increase in the effect of reducing the air permeability unevenness of the resin film 1 as compared to conventional membranes. Additionally, when the variation in the density of the openings 13a in the first principal surface 2 is within this range, the flexibility in controlling the characteristics of the resin film 1 increases; specifically, for example, the characteristics of the resin film 1 can be improved. The variation in the density of the openings 13a in the first principal surface 2 can be 500 openings/cm$^2$ or less, 200 openings/cm$^2$ or less, or even 100 openings/cm$^2$ or less.

For the resin film 1, the diameter of the openings 13a in the first principal surface 2, the variation in the porosity of the first principal surface 2, and the variation in the density of the openings 13a in the first principal surface 2 are specifically defined. This is based on the fact that the diameter of the openings 13a in the principal surface 2 is equal to or smaller than the diameter of the openings 13b in the second principal surface 3, and specifically the fact that the openings 13a having a relatively small diameter have large impact on the air permeability and the air permeability unevenness of the resin film 1.

In the example shown in FIGS. 1 and 2, the openings 13 of the through holes 12 are formed independently of each other and spaced from each other in both of the principal surfaces 2 and 3. In other words, in the example shown in FIGS. 1 and 2, the openings 13 of different through holes 12 do not overlap each other in the principal surfaces 2 and 3 of the resin film 1. When the openings 13 are formed in this manner at least in the effective region of the resin film 1, various factors such as the shape of the through holes 12, the diameters of the through holes 12 (the diameters of the openings 13a and 13b), and the density of the opening 13a in the principal surface 2 can be controlled more accurately and uniformly. In a specific example, the openings 13 are formed at positions corresponding to intersections of an imaginary grid defined on each of the principal surfaces 2 and 3. The production method described below allows relatively easy formation of the through holes 12 and the openings 13 at the positions corresponding to the intersections of the imaginary grid. When the openings 13 are thus arranged, a variation in the interval (pitch) between the openings 13 is so small that the air permeability unevenness of the resin film 1 can be further reduced.

The imaginary grid is not particularly limited and is, for example, a parallelogram grid, hexagonal grid, square grid, rectangular grid, or rhombic grid. These grids have parallelogram-shaped meshes, hexagonal meshes, square meshes, rectangular meshes, and rhombic (face-centered rectangular) meshes, respectively. In the resin film shown in FIGS. 1 and 2, the openings 13 of the through holes 12 are formed at positions corresponding to intersections of an imaginary square grid defined on each of the principal surfaces 2 and 3. In this case, the openings 13 are arranged at equal intervals in two orthogonal directions (for example, in the MD and TD directions of the resin film) on each of the principal surfaces 2 and 3.

In the resin film according to the present invention, the openings 13 of different through holes 12 may be formed to overlap each other in the principal surface 2 and/or principal surface 3 of the resin film 1. Such openings 13 overlapping each other can be formed when, for example, the intervals between the through holes 12 are shortened. For example, the respective edges of the adjacent through holes 12 overlap each other.

In the resin film 1, an air permeability through the thickness thereof may be 1 $cm^3/(cm^2 \cdot sec)$ or more and 150 $cm^3/(cm^2 \cdot sec)$ or less in terms of Frazier number measured according to JIS L 1096 (which may be simply referred to as "Frazier number" hereinafter). In this case, the flexibility in controlling the characteristics of the resin film 1 further increases; specifically, for example, the characteristics of the resin film 1 can be further improved.

A variation in the air permeability (air permeability as expressed in terms of Frazier number) through the thickness of the resin film 1 can be 8% or less, and can, depending on the configuration of the resin film 1, be 7% or less or even 6% or less. When the variation in the air permeability through the thickness of the resin film 1 is within this range, the flexibility in controlling the characteristics of the resin film 1 further increases; specifically, for example, the characteristics of the resin film 1 can be further improved. The variation in the air permeability is determined as the ratio $\sigma/Av$, where Av represents an average of values of the Frazier air permeability measured at five randomly selected points on the resin film 1 and $\sigma$ represents a standard deviation $\sigma$ of the values of the Frazier air permeability.

In the resin film 1, the porosity of the first principal surface 2 is, for example, 0.5 to 50%, preferably 2 to 40%, and more preferably 5 to 35%. When the porosity of the first principal surface 2 is within this range, the flexibility in controlling the characteristics of the resin film 1 further increases; specifically, for example, the characteristics of the resin film 1 can be further improved.

In the resin film 1, the density of the openings in the first principal surface 2 is, for example, $1 \times 10^3$ (openings/$cm^2$) or more. In a specific example, the density of the openings in the first principal surface 2 is $1 \times 10^4$ (openings/$cm^2$) or more and $5 \times 10^5$ (openings/$cm^2$) or less, preferably $1.2 \times 10^4$ (openings/$cm^2$) or more and $4 \times 10^5$ (openings/$cm^2$) or less, and more preferably $1.4 \times 10^4$ (openings/$cm^2$) or more and $3 \times 10^5$ (openings/$cm^2$) or less. When the density of the openings in the first principal surface 2 is within this range, the flexibility in controlling the characteristics of the resin film 1 further increases; specifically, for example, the characteristics of the resin film 1 can be further improved.

When the through holes 12 have a shape in which the area of the cross-section perpendicular to the direction in which the through holes 12 extend increases from the first principal surface 2 toward the second principal surface 3, the ratio of the diameter Rb of the openings 13b in the second principal surface 3 to the diameter Ra of the openings 13a in the first principal surface 2 (the ratio Rb/Ra) is preferably more than 1 and not more than 4 and more preferably more than 1 and not more than 3. When the ratio Rb/Ra is within this range, the flexibility in controlling the characteristics of the resin film 1 further increases; specifically, for example, the characteristics of the resin film 1 can be further improved. When the diameters of the through holes 12 cannot be reduced uniformly over the entire thickness of the resin film 1 because of the nature of the production method (such as due to the limited laser focusing performance in the case where the production method described below is used to produce the resin film 1), increasing the ratio Rb/Ra beyond 1 allows, for example, the resin film 1 to have sufficient waterproofness attributed to the relatively small diameter Ra of the openings 13a.

A variation in the interval between the openings 13a in the first principal surface 2 is, for example, 5% or less and can, depending on the configuration of the resin film 1, be 4% or less or even 3% or less.

For the resin film 1, the porosity, the variation in the porosity, the density of the openings, and the variation in the density of the openings can be determined as follows. First, a magnifying observation means such as an optical microscope is used to take an image of a surface of the resin film 1 (for example, an image of a principal surface whose characteristics are to be evaluated). Next, 10 through holes 12 are randomly selected in the taken image of the surface (principal surface), and the diameters of the openings 13 of the randomly selected through holes 12 are measured. For the measurement of the diameters of the openings 13, an image analysis means can be used. Subsequently, an average Av and a standard deviation $\sigma$ of the measured diameters of the openings 13 are determined. The ratio $\sigma/Av$ represents the variation in the diameters of the openings 13. Next, in the above image, the interval (pitch) between the adjacent through holes 12 (nearest to each other) is measured at 10 sites each in two different directions (for example, in the MD and TD directions of the film). For the measurement, an image analysis means can be used. Subsequently, an average Av and a standard deviation $\sigma$ of the measured intervals are determined for each direction. The ratio $\sigma/Av$ represents the variation in the interval between the through holes 12 in the corresponding direction.

The porosity of the resin film 1 can be determined by the following equation: [(Average area of openings 13 determined from average Av of diameters of openings 13)/{(Average of intervals in one direction)×(Average of intervals in the other direction)}]×100(%).

Such porosity determination is repeated for five randomly selected sites on the surface (principal surface) to be evaluated, and an average Av and standard deviation $\sigma$ of the five values of the porosity are determined. The variation in the porosity can be determined as the ratio $\sigma/Av$.

The density of the openings can be determined as an average Av of density values obtained from the images (five images) used for the porosity determination. In addition to the average Av, a standard deviation $\sigma$ of the density values obtained from the five images is determined. The variation in the density of the openings can be determined as the ratio $\sigma/Av$.

In the examples shown in FIGS. 1 to 3, the through holes 12 extend in a perpendicular direction to the principal surfaces 2 and 3 of the resin film 1. Alternatively, the through holes 12 may extend in a direction oblique to the perpendicular direction to the principal surfaces 2 and 3 of the resin film 1. Still alternatively, there may be both through holes 12 that extend in the perpendicular direction and through holes 12 that extend in a direction oblique to the perpendicular direction in the resin film 1. The directions in which the through holes 12 extend in the resin film 1 can be confirmed, for example, by observing the principal surfaces and a cross-section of the resin film 1 with a SEM.

The thickness of the resin film 1 is, for example, 5 μm or more and 50 μm or less, and preferably 8 μm or more and 30 μm or less. When the thickness of the resin film 1 is within this range, for example, the ease of handling of the resin film 1 significantly improves, and the ease of production of the resin film 1 also significantly improves.

In view of the strength and ease of handling of the resin film 1 and also in view of the sound permeability of the film 1 to be used as a sound-permeable membrane, the apparent specific gravity of the film 1 is preferably 0.1 to 1.5 g/cm$^3$ and more preferably 0.2 to 1.4 g/cm$^3$.

The resin film 1 can have, for example, the characteristics as described hereinafter.

For example, when the resin film 1 has an effective area of 4.9 mm$^2$, a sound pressure loss (insertion loss) at a frequency of 5 kHz can be 5 dB or less. Depending on the configuration of the resin film 1, the sound pressure loss at a frequency of 5 kHz can be 3 dB or less, 2 dB or less, or even 1 dB or less. With the use of conventional polymer membranes, such a low sound pressure loss at a high frequency is difficult to achieve.

For example, when the resin film 1 has an effective area of 4.9 mm$^2$, a sound pressure loss (insertion loss) at a frequency of 7 kHz can be 5 dB or less. Depending on the configuration of the resin film 1, the sound pressure loss at a frequency of 7 kHz can be 3 dB or less, 2 dB or less, or even 1 dB or less.

For example, when the resin film 1 has an effective area of 4.9 mm$^2$, sound pressure loss (insertion loss) at a frequency of 10 kHz can be 5 dB or less. Depending on the configuration of the resin film 1, the sound pressure loss at a frequency of 10 kHz can be 3 dB or less.

The "effective area" of the resin film 1 refers to the area of a region (effective region) that needs to have a function required for an application in which the resin film 1 is to be used. For example, when the resin film 1 is used as a sound-permeable membrane, the effective area corresponds to the area of the region through which sound actually enters, travels in, and exits the resin film 1. Specifically, the effective area does not include the area of a component such as a supporting member or bonding portion which is placed or formed on the peripheral portion of the resin film 1 for attachment of the resin film 1. Typically, the effective area corresponds to the area of an opening portion of a housing when the resin film 1 is placed to cover the opening portion, or corresponds to the area of an opening portion of a supporting member when the supporting member is placed on the peripheral portion of the resin film 1.

The material composing the resin film 1 is not particularly limited. The material is, for example, a material that allows the production method described below to form the through holes 12 in an original film which is a polymer resin film. Examples of the material composing the resin film 1 include: polyolefins such as polyethylene and polypropylene; polyesters such as polyethylene terephthalate (PET), polybutylene terephthalate, and polyethylene naphthalate; fluorine resins such as polytetrafluoroethylene (PTFE); polyimide; polyamideimide; polyetheretherketone; polysulfone; polybutadiene; epoxy resin; polystyrene; polymethyl methacrylate; polycarbonate; triacetyl cellulose; polyvinyl alcohol; polyurethane; ABS resin; ethylene-propylene-diene copolymer; and silicone rubber. When the resin film 1 is produced by the production method described below, the material composing the resin film 1 is preferably PET, polypropylene, PTFE, polyimide, polymethyl methacrylate, polycarbonate, triacetyl cellulose, polyurethane, or silicone rubber, in view of the ease of hole formation by use of a laser. The same applies to the material composing the original film.

In the example shown in FIGS. 1 and 2, the substrate structure of the resin film 1 is a non-porous structure. The substrate structure of the resin film 1 need not necessarily be a non-porous structure and may be, for example, a porous structure or a void structure having independent voids. In this case, the resin film 1 has the through holes 12 in addition to the pores contained in the substrate structure (when, for example, the substrate structure is a porous structure) or the voids contained in the substrate structure (when, for example, the substrate structure is a void structure).

The resin film 1 may be constituted by a plurality of layers. In this case, a bonding agent and/or an adhesive agent may be placed between the layers, as long as the desired characteristics can be obtained.

The application of the resin film 1 is not limited. The resin film 1 can be used in any applications for which the characteristics of the resin film 1 are appropriate. The resin film 1 can be used in various applications irrespective of the air permeability of the resin film 1. Naturally, the resin film 1 can be used also in applications that can enjoy benefits from the small air permeability unevenness of the resin film 1. Specific examples of the application include air-permeable membranes, sound-permeable membranes, waterproof air-permeable membranes, waterproof sound-permeable membranes, and acoustic resistors.

When the resin film 1 is used as an air-permeable membrane, good air permeability is expected to be achieved thanks to the small air permeability unevenness of the resin film 1. Additionally, the flexibility in controlling the air permeability is high as described above.

When the resin film 1 is used as a waterproof air-permeable membrane having waterproofness as well as air permeability, good waterproofness is also expected to be achieved. Additionally, the flexibility in controlling the waterproofness is high as described above.

When the resin film 1 is used as an air-permeable membrane, the diameter of the openings 13a of the through holes 12 is preferably 5 to 50 μm. When the resin film 1 is used as a waterproof air-permeable membrane, the diameter of the openings 13a of the through holes 12 is preferably 3 to 15 μm.

When the resin film 1 is used as a sound-permeable membrane, good sound permeability is expected to be achieved thanks to the small air permeability unevenness of the resin film 1. Additionally, the flexibility in controlling the sound permeability is high as described above.

When the resin film 1 is used as a waterproof sound-permeable membrane having waterproofness as well as sound permeability, good waterproofness is also expected to be achieved. Additionally, the flexibility in controlling the waterproofness is high as described above.

When the resin film 1 is used as a sound-permeable membrane, the diameter of the openings 13a of the through holes 12 is preferably 5 to 50 μm. When the resin film 1 is used as a waterproof sound-permeable membrane, the diameter of the openings 13a of the through holes 12 is preferably 3 to 15 μm.

When the resin film 1 is used as an acoustic resistor, sound passing through the resistor is expected to have good characteristics thanks to the small air permeability unevenness of the resin film 1. Additionally, the flexibility in controlling the characteristics of sound passing through the resistor is high as described above.

Two or more resin films 1 may be used in combination, or one resin film 1 may be used in combination with another member.

The resin film 1 may be subjected to a coloring treatment. Depending on the type of the material composing the resin film 1, the resin film 1 not subjected to any coloring treatment is, for example, transparent or white. When such a resin film 1 is used in an application, the resin film 1 may be conspicuous depending on the nature of the application or on the manner of placement of the resin film 1. Such a conspicuous membrane may so stimulate the curiosity of a user as to induce the user to stab the resin film 1 with a needle or the like, thereby impairing the function of the resin film 1. When the resin film 1 has been subjected to a coloring treatment so that, for example, the resin film 1 has a color identical or similar to the color of a part in which the resin film 1 is placed, the potential to attract the user's attention can be relatively reduced. In some cases, the resin film 1 needs to be colored because of requirements as to the visual appearance of a part or product in which the resin film 1 is placed. Such requirements as to visual appearance can be met by means of the coloring treatment.

The coloring treatment can be accomplished, for example, by dyeing the resin film 1 or by incorporating a colorant into the resin film 1. The coloring treatment may be carried out, for example, so as to enable absorption of light in the wavelength range of 380 nm to 500 nm. That is, the resin film 1 may be subjected to a coloring treatment that enables the film 1 to absorb light in the wavelength range of 380 nm to 500 nm. To this end, for example, the resin film 1 contains a colorant having the ability to absorb light in the wavelength range of 380 nm to 500 nm or is dyed with a dye having the ability to absorb light in the wavelength range of 380 nm to 500 nm. In this case, the resin film 1 can be colored, for example, blue, gray, brown, pink, green, or yellow. The resin film 1 may be colored black, gray, brown, or pink.

When the resin film 1 is produced by the production method described below, the resin film 1 may be obtained as a colored film by forming the through holes 12 in an original film subjected to a coloring treatment. Alternatively, the through holes 12 may be formed in an original film, and then the resulting film may be subjected to a coloring treatment to obtain the resin film 1 as a colored film.

When the resin film 1 is colored black or gray, the degree of coloring is preferably such that the whiteness W described below is in the range of 15.0 to 70.0. The whiteness W can be determined as follows: The lightness L, hue a, and chroma b of a principal surface of the resin film 1 are measured using a color-difference meter according to JIS L 1015 (Hunter method), and the whiteness W is calculated from the measured values by the following equation: $W=100-\mathrm{sqr}[(100-L)^2+(a^2+b^2)]$. The lower the value of the whiteness W is, the blacker the resin film 1 is.

Figure 4:
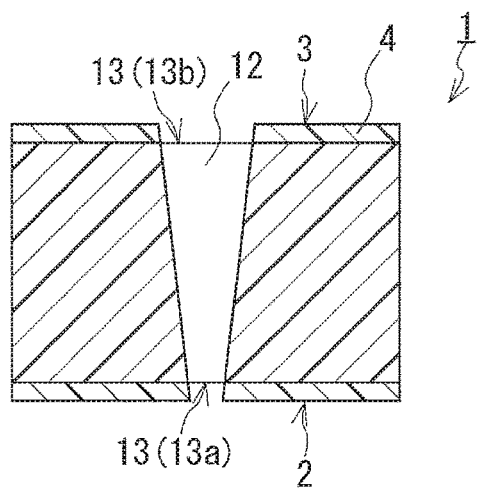
FIG. 4 is a cross-sectional view schematically showing another exemplary polymer film according to the present invention.

The resin film 1 may be subjected to a liquid-repellent treatment (water-repellent and/or oil-repellent treatment). In this case, a liquid-repellent layer 4 is formed on a surface of at least a portion of the resin film 1 (see FIG. 4, for example). The liquid-repellent layer 4 may be formed only on one of the principal surfaces of the resin film 1 or may be formed on both of the two principal surfaces. The liquid-repellent layer 4 can be formed on the interiors (inner peripheral surfaces) of the through holes 12. When the through holes 12 of the resin film 1 have a shape in which the area of the cross-section perpendicular to the direction in which the through holes 12 extend increases from the first principal surface 2 toward the second principal surface 3, the liquid-repellent layer 4 may be formed on the first principal surface 2 at which the diameter of the openings of the through holes 12 is relatively small or may be formed over the entire surfaces including the interiors of the through holes 12 and the principal surface 3.

The liquid-repellent layer 4 typically has openings positioned in correspondence with the openings 13 (13a and 13b).

The liquid-repellent layer 4 is a water-repellent layer and preferably further has oil repellency.

The liquid-repellent layer 4 can be formed, for example, as follows: A treatment solution prepared by diluting a water-repellent agent or hydrophobic oil-repellent agent with a diluent is thinly spread and dried on the resin film 1. Examples of the water-repellent agent and hydrophobic oil-repellent agent include fluorine compounds such as perfluoroalkyl acrylate and perfluoroalkyl methacrylate.

When waterproofness (liquid repellency) is imparted by the liquid-repellent layer 4 to the resin film 1, the waterproofness of the resin film 1 can be evaluated, for example, by a water entry pressure measured according to Method B (high hydraulic pressure method) of water penetration test specified in JIS L 1092. The water entry pressure is, for example, 2 kPa or more and can, depending on the configuration of the resin film 1, be 5 kPa or more or even 10 kPa or more. The details of the liquid-repellent treatment, liquid-repellent layer 4, and water entry pressure and the specific values of the water entry pressure are the same for various applications of the resin film 1, such as use as an air-permeable membrane, use as a sound-permeable membrane, and use as an acoustic resistor.

The resin film 1 can be produced, for example, by the below-described method for producing a resin film.

[Air-Permeable Membrane and Air-Permeable Membrane Member]

An air-permeable membrane according to the present invention includes the resin film 1. The air-permeable membrane is an embodiment of the use of the resin film 1 as an air-permeable membrane.

For example, the air-permeable membrane is placed to cover an opening of a housing of a product such as an electronic device, and prevents entry of foreign matter such as dust into the housing through the opening while permitting passage of a gas (typically air) between the outside and inside of the housing. This membrane is used, for example, for control of the pressure inside the housing.

When the air-permeable membrane further has waterproofness, namely, when the membrane is a waterproof air-permeable membrane, for example, the membrane is placed to cover an opening of a housing of a product such as an electronic device, and prevents entry of water into the housing through the opening while permitting passage of a gas (typically air) between the outside and inside of the housing. This membrane is used, for example, for control of the pressure inside the housing.

The air-permeable membrane, which includes the resin film 1, can exhibit the above-described various features and characteristics of the resin film 1.

To further have waterproofness, the air-permeable membrane may be subjected to a liquid-repellent treatment. In this case, the liquid-repellent layer 4 is formed on a surface of at least a portion of the air-permeable membrane. The liquid-repellent layer 4 may be formed only on one of the principal surfaces of the air-permeable membrane or may be formed on both of the principal surfaces. The liquid-repellent layer 4 can be formed on the interiors (inner peripheral surfaces) of the through holes 12 of the resin film 1. When the through holes 12 of the resin film 1 have a shape in which the area of the cross-section perpendicular to the direction in which the through holes 12 extend increases from the first principal surface 2 toward the second principal surface 3, the liquid-repellent layer 4 may be formed on one principal surface of the air-permeable membrane, the one principal surface being located closer to the first principal surface 2 at which the diameter of the openings of the through holes 12 is relatively small than to the second principal surface 3 or being the first principal surface 2 itself. The liquid-repellent layer 4 may be formed over the entire surfaces including the interiors of the through holes 12 of the resin film 1 and the other principal surface of the air-permeable membrane, the other principal surface being located closer to the second principal surface 3 than to the first principal surface 2 or being the second principal surface 3 itself.

The air-permeable membrane subjected to a liquid-repellent treatment can be used, for example, as a waterproof air-permeable membrane.

The air-permeable membrane may include two or more resin films 1.

The shape of the air-permeable membrane is not limited.

The air-permeable membrane may, if desired, include an additional member and/or layer other than the resin film 1 and the liquid-repellent layer 4. The member is, for example, an air-permeable supporting layer. The air-permeable supporting layer is placed, for example, on at least one of the principal surfaces of the resin film 1. The placement of the air-permeable supporting layer improves the strength and ease of handling of the air-permeable membrane. The air-permeable supporting layer may be placed on each of the principal surfaces 2 and 3 of the resin film 1.

The air-permeable supporting layer has a higher through-thickness air permeability than the resin film 1. For example, a woven fabric, non-woven fabric, net, or mesh can be used as the air-permeable supporting layer. The material composing the air-permeable supporting layer is, for example, polyester, polyethylene, or aramid resin. The liquid-repellent layer 4 may be formed on that principal surface of the resin film 1 over which the air-permeable supporting layer is to be placed. The shape of the air-permeable supporting layer may be identical to or different from the shape of the resin film 1. For example, the air-permeable supporting layer can have a shape adapted for placement only on the peripheral portion of the resin film 1 (in particular, a ring shape adapted for placement only on the peripheral portion of the resin film 1 that is circular). The placement of the air-permeable supporting layer is accomplished, for example, by a technique such as thermal welding, or bonding by an adhesive, to the resin film 1.

An example of the additional member other than the air-permeable supporting layer is a supporting member. The supporting member is placed, for example, on at least one of the principal surfaces of the air-permeable membrane. In a specific example, the supporting member is placed on at least one of the principal surfaces of the resin film 1. The placement of the supporting member improves the strength and ease of handling of the air-permeable membrane. The supporting member may be placed on each of the principal surfaces of the air-permeable membrane. In a specific example, the supporting member may be placed on each of the principal surfaces 2 and 3 of the resin film 1.

The supporting member may not have air permeability in some cases. In such cases, the supporting member is configured to allow the resin film 1 to exhibit air permeability; for example, the supporting member has an opening portion. The supporting member has a shape, for example; adapted for placement only on the peripheral portion of the air-permeable membrane (the peripheral portion of the resin film 1). The placement of the supporting member is accomplished, for example, by a technique such as thermal welding, ultrasonic welding, bonding by an adhesive, or bonding by a double-coated adhesive tape, to the air-permeable membrane (resin film 1).

The material composing the supporting member is not limited, and examples of the material include resins, metals, and composites thereof. Examples of the resins include: polyolefins such as polyethylene and polypropylene; polyesters such as PET and polycarbonate; polyimides; and composites thereof. Examples of the metals include meals having high corrosion resistance such as stainless steel and aluminum.

The thickness of the supporting member is, for example, 5 to 500 μm, and preferably 25 to 200 μm. In view of its function as the portion for attachment, the ring width (frame width: difference between the outer size and inner size) is suitably about 0.5 to 2 mm. A foamed material made of resin may be used as the supporting member.

The air-permeable membrane with the supporting member can be handled and sold as an air-permeable membrane member including an air-permeable membrane and a supporting member joined to the air-permeable membrane. Examples of the air-permeable membrane member are shown in FIG. 5 and FIG. 6.

Figure 5:
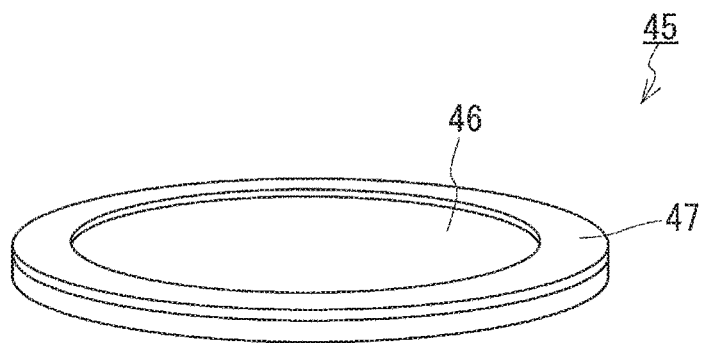
FIG. 5 is a perspective view schematically showing an exemplary air-permeable membrane member according to the present invention.
Figure 6:
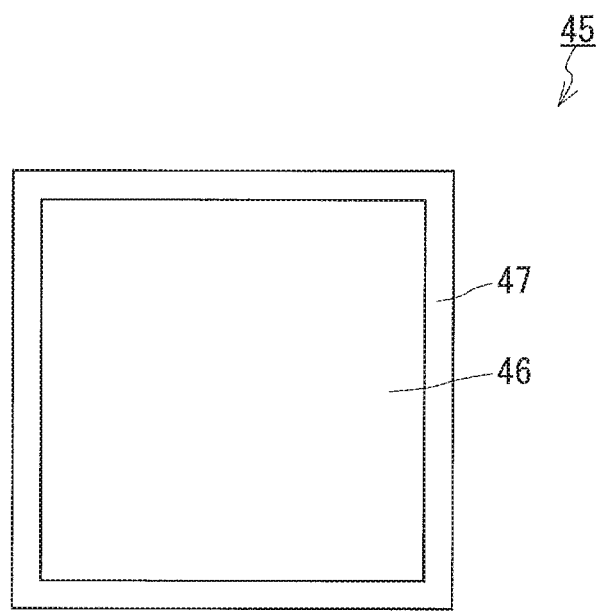
FIG. 6 is a perspective view schematically showing another exemplary air-permeable membrane member according to the present invention.

The air-permeable membrane member 45 shown in FIG. 5 includes: an air-permeable membrane 46 that is circular when viewed in a direction perpendicular to its principal surfaces; and a supporting member 47 that is a ring-shaped sheet joined to the peripheral portion of the air-permeable membrane 46. The joining of the supporting member 47 to the air-permeable membrane 46 reinforces the air-permeable membrane 46 and improves the ease of handling of the air-permeable membrane 46. Additionally, when the air-permeable membrane 46 (or the air-permeable membrane member 45) is attached to an opening of a housing, the supporting member 47 can serve as a portion for attachment which makes easier the attachment of the air-permeable membrane 46 (air-permeable membrane member 45).

The shape of the supporting member 47 is not limited. For example, as shown in FIG. 6, the supporting member 47 may be a frame-shaped sheet joined to the peripheral portion of the air-permeable membrane 46 that is rectangular when viewed in a direction perpendicular to its principal surfaces. Conforming the shape of the supporting member 47 to the shape of the peripheral portion of the air-permeable membrane 46 as shown in FIGS. 5 and 6 reduces the deterioration in the characteristics of the air-permeable membrane 46 caused by the placement of the supporting member 47. In view of the ease of handling of the air-permeable membrane 46 and the ease of attachment of the air-permeable membrane 46 to a housing, it is preferable for the supporting member 47 to be in the form of a sheet.

The air-permeable membrane member 45 may include two or more air-permeable membranes 46 and/or two or more supporting members 47.

The air-permeable membrane and the air-permeable membrane member may be colored as described above. To this end, for example, at least one selected from the resin film 1, the air-permeable supporting layer, and the supporting member is subjected to the coloring treatment.

The air-permeable membrane and the air-permeable membrane member can be used in various applications such as in ventilation members, waterproof ventilation members, electronic devices, cases, ventilation structures, and waterproof ventilation structures. The specific configurations of these members, devices, and structures are not limited as long as they include an air-permeable membrane or air-permeable membrane member including the resin film 1 according to the present invention. Components other than the air-permeable membrane and air-permeable membrane member can be those known as components of such members, devices, and structures.

When the air-permeable membrane or the air-permeable membrane member is attached to an opening of a housing, the attachment may be carried out in such a manner that the principal surface 2 of the resin film 1 included in the air-permeable membrane faces the housing or that the principal surface 3 of the resin film 1 faces the housing.

The method for producing the air-permeable membrane and the method for producing the air-permeable membrane member are not particularly limited.

[Sound-Permeable Membrane]

A sound-permeable membrane according to the present invention includes the resin film 1. The sound-permeable membrane is an embodiment of the use of the resin film 1 as a sound-permeable membrane.

For example, the sound-permeable membrane is placed to cover an opening of a housing of a product such as an electronic device, and prevents entry of foreign matter such as dust into the housing through the opening while permitting transmission of sound between the outside and inside of the housing. In a specific example where a product such as an electronic device contains an audio part including a sound emitter such as a speaker and/or a sound receiver such as a microphone and the housing of the product is provided with an opening portion for allowing transmission of sound to the audio part, the sound-permeable membrane is placed to cover the opening portion (sound transmission port) and, prevents entry of foreign matter such as dust into the electronic device through the opening portion while permitting transmission of sound between the outside of the electronic device and the audio part.

When the sound-permeable membrane further has waterproofness, namely, when the membrane is a waterproof sound-permeable membrane, for example, the membrane is placed to cover an opening of a housing of a product such as an electronic device and prevents entry of water into the housing through the opening while permitting transmission of sound between the outside and inside of the housing. In a specific example where a product such as an electronic device contains an audio part including a sound emitter such as a speaker and/or a sound receiver such as a microphone and the housing of the product is provided with an opening portion for allowing transmission of sound to the audio part, the sound-permeable membrane is placed to cover the opening portion (sound transmission port) and prevents entry of water into the electronic device through the opening portion while permitting transmission of sound between the outside of the electronic device and the audio part.

The sound-permeable membrane, which includes the resin film 1, can have the above-described various features and characteristics of the resin film 1.

To further have waterproofness, the sound-permeable membrane may be subjected to a liquid-repellent treatment. Possible states of the resulting liquid-repellent layer 4 are the same as in the liquid-repellent air-permeable membrane described above, except that the resin film 1 is used as the sound-permeable membrane rather than as the air-permeable membrane. The sound-permeable membrane subjected to the liquid-repellent treatment can be used, for example, as a waterproof sound-permeable membrane.

As regards the sound permeability of the sound-permeable membrane, when, for example, the sound-permeable membrane has an effective area of $4.9$ mm$^2$, a sound pressure loss (insertion loss) at a frequency of 5 kHz can be 5 dB or less thanks to the high flexibility in controlling the sound permeability of the resin film 1. Depending on the configuration of the resin film 1, the sound pressure loss at a frequency of 5 kHz can be 3 dB or less, 2 dB or less, or even 1 dB or less. Additionally, for example, when the sound-permeable membrane has an effective area of $4.9$ mm$^2$, a sound pressure loss (insertion loss) at a frequency of 7 kHz can be 5 dB or less. Depending on the configuration of the resin film 1, the sound pressure loss at a frequency of 7 kHz can be 3 dB or less, 2 dB or less, or even 1 dB or less. Furthermore, for example, when the sound-permeable membrane has an effective area of $4.9$ mm$^2$, a sound pressure loss (insertion loss) at a frequency of 10 kHz can be 5 dB or less. Depending on the configuration of the resin film 1, the sound pressure loss at a frequency of 10 kHz can be 3 dB or less.

The larger the effective area of a sound-permeable membrane is, the higher the sound permeability of the sound-permeable membrane is. However, the sound-permeable membrane according to the present invention can have high sound permeability as described above even when its effective area is as small as $4.9$ mm$^2$. This advantageous feature contributes, for example, to an increase in the flexibility in the visual appearance and design of an electronic device including the sound-permeable membrane, in particular a reduction in size and/or thickness of the electronic device.

The sound-permeable membrane may include two or more resin films 1.

The shape of the sound-permeable membrane is not limited.

The sound-permeable membrane may, if desired, include an additional member and/or layer other than the resin film 1 and the liquid-repellent layer 4. The member is, for example, an air-permeable supporting layer and/or supporting member as described above. The specific configurations of the air-permeable supporting layer and the supporting member and the manner of placement of the air-permeable supporting layer and the supporting member on the sound-permeable membrane can be the same as those described above for the air-permeable membrane.

The sound-permeable membrane with the supporting member can be handled and sold as a sound-permeable membrane member including a sound-permeable membrane and a supporting member joined to the sound-permeable membrane. Examples of the configuration of the sound-permeable membrane member can be the same as examples of the configuration of the air-permeable membrane member such as those shown in FIGS. 5 and 6 in the these figures, except that the air-permeable membrane 46 is replaced by the sound-permeable membrane. The sound-permeable membrane member can enjoy the effects derived from the supporting member 47 which are described above for the air-permeable membrane member.

The sound-permeable membrane member may include two or more sound-permeable membranes and/or two or more supporting members 47.

The sound-permeable membrane and the sound-permeable membrane member may be colored as described above. To this end, for example, at least one selected from the resin film 1, the air-permeable supporting layer, and the supporting member may be subjected to the coloring treatment.

The sound-permeable membrane and the sound-permeable membrane member can be used in various applications such as in sound-transmission members, waterproof sound-transmission members, electronic devices, cases, sound-transmission structures, and waterproof sound-transmission structures. The specific configurations of these members, devices, and structures are not limited as long as they include a sound-permeable membrane or sound-permeable membrane member including the resin film 1 according to the present invention. Components other than the sound-permeable membrane and sound-permeable membrane member can be those of known members, devices, and structures.

When the sound-permeable membrane or the sound-permeable membrane member is attached to an opening of a housing, the attachment may be carried out in such a manner that the principal surface 2 of the resin film 1 included in the sound-permeable membrane faces the housing or that the principal surface 3 of the resin film 1 faces the housing.

The method for producing the sound-permeable membrane and the method for producing the sound-permeable membrane member are not particularly limited.

[Acoustic Resistor]

An acoustic resistor according to the present invention includes the resin film 1. The acoustic resistor is an embodiment of the use of the resin film 1 as an acoustic resistor.

The acoustic resistor is a member placed in an audio device to adjust the characteristics of sound output from the audio device and/or sound input to the audio device. Specifically, the audio device includes: a transducing part that performs conversion between sound and an electrical signal, the transducing part including an acoustic element that sends and/or receives the sound; and a housing enclosing the transducing part and having at least one opening portion. In the audio device, a gas passage communicating with the at least one opening portion is present in the housing, and the acoustic element is placed in this passage. The acoustic resistor is placed between the at least one opening portion and the acoustic element in the gas passage and includes a resin film having air permeability through its thickness. In the acoustic resistor according to the present invention, the resin film having air permeability through its thickness is the resin film 1 according to the present invention.

Figure 7:
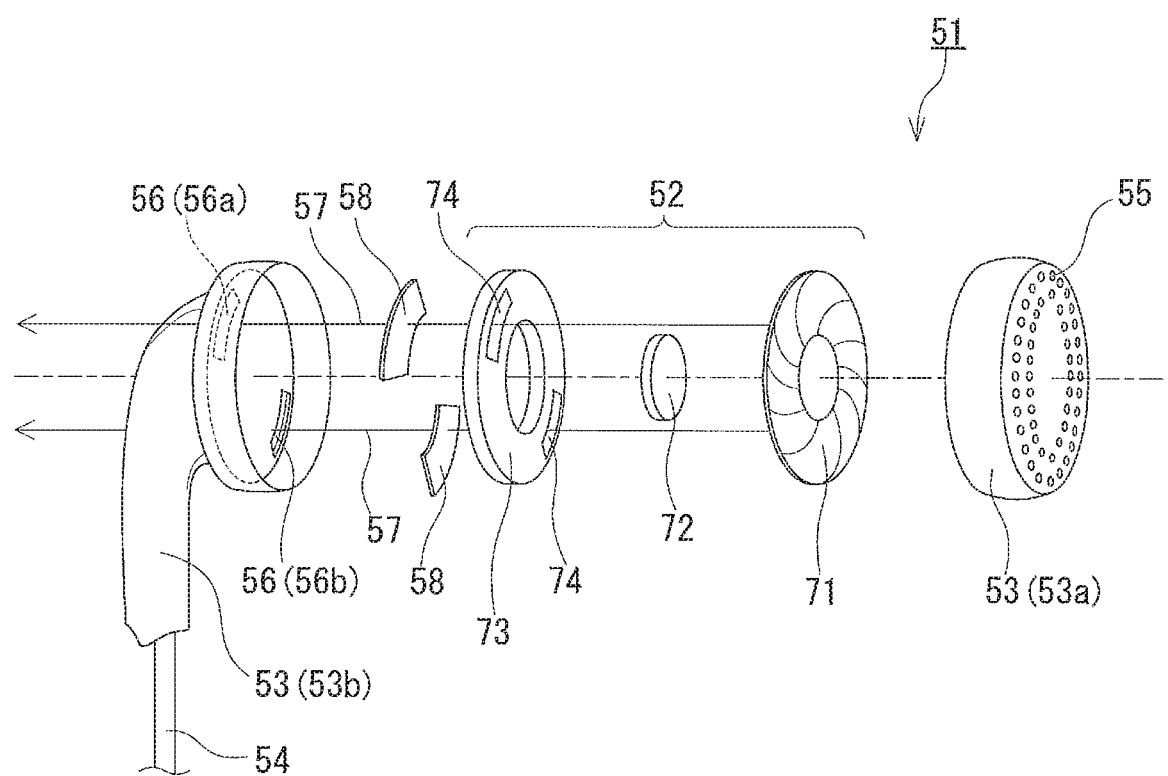
FIG. 7 is an exploded perspective view schematically showing an exemplary audio device including an acoustic resistor according to the present invention.

To facilitate understanding of the acoustic resistor, FIG. 7 shows an exemplary audio device including the acoustic resistor according to the present invention. The audio device shown in FIG. 7 is an earphone unit 51 for constituting one-half (right-ear or left-ear portion) of an earphone set.

The earphone unit 51 includes: a transducing part 52 including a vibration plate 71 serving as an acoustic element that sends sound; a front housing 53a; and a rear housing 53b. The transducing part 52 is placed between the front housing 53a and the rear housing 53b which are united as a housing 53 of the unit 51. The transducing part 52 includes the vibration plate 71, a magnet 72, and a frame 73, which are united together. The vibration plate 71 is a circular film, and a cylindrical coil is disposed on a surface (rear surface) of the vibration plate 71 that is opposite to the surface (front surface) seen in the figure. The magnet 72 is circular and, when the transducing part 52 is assembled, the magnet 72 is placed inside the opening portion of the coil disposed on the rear surface of the vibration plate 71 and inside the opening portion of the frame 73 which is ring-shaped. The vibration plate 71 is joined at its peripheral portion to the frame 73, and the portion (main portion) of the vibration plate 71 other than the peripheral portion can freely vibrate in response to the movement of the coil. Upon delivery of an electrical signal (electrical signal carrying sound information; sound signal) to the transducing part 71, a current corresponding to the signal flows in the coil to induce electromagnetic interaction between the current and the magnet 72. The electromagnetic interaction causes the vibration plate 71 to undergo a physical vibration corresponding to the sound signal, and this vibration is sent in the form of sound from the vibration plate 71. That is, the transducing part 52 functions as a transducer that performs conversion between an electrical signal carrying sound information and sound. The electrical signal to be delivered to the transducing part 52 is fed to the coil ring on the rear surface of the vibration plate 71 through a cable 54 connected to the rear housing 53b of the unit 51. The electrical connection between the cable 54 and the coil is not shown in the figure.

The housing(s) 53 (53a, 53b) of the unit 51 has (have) openings (opening portions). One of the opening portions is a sound transmission port 55 provided in the front housing 53a. The sound sent from the front surface of the vibration plate 71 is transmitted to the outside of the unit 51 through the sound transmission port 55. Another of the opening portions is an opening portion 56 provided in the rear housing 53b. The rear housing 53b is provided with two openings 56a and 56b.

In the housing 53 of the unit 51 there is a passage 57 for gas (air in the case of a typical usage environment) that communicates with the openings 56a and 56b. The passage 57 extends from the openings 56a and 56b to the rear surface of the vibration plate 71 through openings 74 provided in the frame 73. That is, the vibration plate 71 serving as an acoustic element is placed at an end of the passage 57 (the end remote from the openings 56a and 56b). In FIG. 7, the passage 57 is shown in the form of a straight line for ease of understanding. However, given that the passage 57 is a gas passage, it should be understood that any region in the housing 53 with which a gas can communicate through the openings 56a and 56b can serve as the passage 57. In the unit 51, acoustic resistors 58 are placed between the openings 56a and 56b and the vibration plate 71 in the passage 57. Specifically, the acoustic resistors 58 have a shape corresponding to a part of a ring and conforming to the shape of the openings 74 of the frame 73 and are joined to the frame 73 to cover the openings 74. In the unit 51 shown in FIG. 7, the passage 57 always passes through the acoustic resistors 58. It can be said that the acoustic resistors 58 are placed in the unit 51 so as to cover a cross-section of the passage 57.

Each acoustic resistor 58 is composed of the resin film 1 having air permeability through its thickness.

The provision of the gas passage 57 extending from the acoustic element to the opening portion 56 can, for example, prevent disturbance of the movement (vibration) of the vibration plate 71 serving as the acoustic element. This effect is particularly significant in the earphone unit 51, because the internal volume of the housing 53, especially the volume of the region opposite to the sound transmission port 55 with respect to the vibration plate 71 (the region between the rear surface of the vibration plate and the rear housing), is small. The placement of the acoustic resistor 58 serving as a resistance to the flow of a gas travelling in the passage 57 improves the characteristics of sound output from the earphone unit 51 which is an audio device and therefore the characteristics of sound output from an earphone set including the unit 51. An example of the characteristics to be improved is the quality of sound output from the earphone unit 51 and an earphone set including the unit 51. Specific examples of improvements in sound quality include: output of sound in exact accordance with sound signals input to the transducing part 52; reduction in undesired resonance; flattening of the frequency characteristics of output sound; amplification or attenuation of output sound in a certain frequency range; and achievement of directionality or non-directionality. The same improvements in characteristics can be achieved for sound-emitting audio devices other than the earphone unit shown as an example in FIG. 7. Also for sound-receiving audio devices such as a microphone, the corresponding improvements in characteristics can be achieved.

For the acoustic resistor 58 including the resin film 1, unevenness (unevenness of characteristics and/or structure, such as air permeability unevenness) is smaller than for conventional acoustic resistors which are composed of a porous body such as a sponge, of a non-woven fabric, or of a woven fabric such as a mesh. The term "unevenness" includes all of the following: unevenness within the surface of one acoustic resistor; unevenness between two or more acoustic resistors placed in an audio device (except when the characteristics such as air permeability and/or the structure is deliberately varied between the acoustic resistors); and unevenness between acoustic resistors which are respectively included in two units used for one device (the units are, for example, left and right earphone units of an earphone set). The fact that such unevenness is small offers, for example, the following advantage.

That is, the above-described effects, in particular the improvements in audio device characteristics, which are provided by the provision of the passage 57 and the placement of the acoustic resistor 58 in the passage 57, can be more reliably achieved. In addition, the flexibility in designing audio devices to adjust or improve their characteristics increases.

Reduced unevenness within the surface of one acoustic resistor and reduced unevenness between two or more acoustic resistors placed in an audio device lead, for example, to a further improvement in audio device characteristics such as sound pressure characteristics. Additionally, for example, such reduced unevenness makes it possible, in manufacturing of audio devices, to simplify or skip the step of sorting out acoustic resistors with as small unevenness as possible or the steps conventionally performed to reduce unevenness within one acoustic resistor or between acoustic resistors as much as possible on the assumption that there is inevitably some degree of unevenness. Examples of the steps conventionally performed include: the step of adjusting the shape of acoustic resistors; the step of adjusting how acoustic resistors are placed in audio devices; the step of adjusting how acoustic resistors are joined to other members constituting audio devices; and the step of accurately testing the characteristics of the produced audio devices. Simplifying or skipping these steps leads to an increase in production yield of audio devices and a decrease in production cost of the audio devices. For an audio device such as an earphone set which is constructed of a combination of two or more units, reduced unevenness between the acoustic resistors included in the units can, for example, result in reduced unevenness of output characteristics between the units. This, for example, makes it possible to simplify or skip the step of sorting out and combining left and right units having similar or identical output characteristics in manufacturing of earphone sets. In addition, the reduced unevenness of output characteristics between earphone units presents the possibility of allowing each earphone unit to be sold alone as a manufacturing part or replacement part, although persons skilled in the art have taken it for granted that a single earphone unit cannot be sold alone due to unevenness of output characteristics. This possibility is of great significance.

Besides, the acoustic resistor 58 including the resin film 1 can have dustproofness. The acoustic resistor 8 having dustproofness performs a function as a dustproof member in addition to the above function of improving the characteristics of an audio device. The placement of such an acoustic resistor 58 in the passage 57 can, for example, prevent entry of foreign matter such as dust into the housing 53 of the audio device through the opening portion 56, thus allowing the audio device to have dustproof performance. The level of dustproofness of the acoustic resistor 58 can be controlled, for example, by adjusting the diameters of the openings 13, in particular the diameter of the openings 13*a*, of the through holes 12 of the resin film 1.

The acoustic resistor 58 may be subjected to a liquid-repellent treatment. In this case, the acoustic resistor 58 can have waterproofness. The acoustic resistor 58 having waterproofness performs a function as a waterproof member in addition to the above function of improving the characteristics of an audio device. The placement of such an acoustic resistor 58 in the passage 57 can, for example, prevent entry of water into the housing 53 of the audio device through the opening portion 56, thus allowing the audio device to have waterproof performance. The level of waterproofness of the acoustic resistor 58 can be controlled, for example, by adjusting the configuration of the liquid-repellent layer and the diameters of the through holes 12 of the resin film 1.

The state of the liquid-repellent layer 4 formed by the liquid-repellent treatment is the same as in the liquid-repellent air-permeable membrane described above, except that the resin film 1 is used as the acoustic resistor rather than as the air-permeable membrane.

The acoustic resistor 58 can have both dustproofness and waterproofness.

Depending on its material, the acoustic resistor 58 can have higher stability over time than conventional acoustic resistors. In some cases, for example, a porous body made of urethane foam is used as an acoustic resistor; however, the stability over time of such an acoustic resistor is by no means satisfactory, since the urethane resin is hydrolyzable by atmospheric moisture. By contrast, the acoustic resistor 58 including the resin film 1 made of, for example, polyethylene terephthalate (PET) exhibits much higher stability over time.

An audio device generally has a housing provided with a sound transmission port for transmission of sound between an acoustic element enclosed in the housing and the outside of the device, with the exception of devices such as a type of speaker whose acoustic element is exposed to the outside. In the earphone unit 51 shown in FIG. 7, the front housing 53*a* is provided with the sound transmission port 55. The acoustic resistor 58 can be placed in the gas passage that serves as a passage for transmission of sound between the acoustic element and the sound transmission port.

When the resin film 1 has the through holes 12 having a shape in which the area of the cross-section perpendicular to the direction in which the through holes 12 extend increases from the first principal surface 2 toward the second principal surface 3, the use of the acoustic resistor 58 including such a resin film 1 allows the resistance to gas flow in the passage 57 to be varied widely or in a different range than the use of an acoustic resistor not having such a configuration. Thus, the flexibility in controlling the characteristics of an audio device by the use of the acoustic resistor 58 further increases. The high flexibility contributes to an improvement in the characteristics of the audio device and to an increase in flexibility in the design of the audio device.

As regards the sound permeability of the acoustic resistor 58, when, for example, the acoustic resistor has an effective area of 4.9 mm$^2$, a sound pressure loss (insertion loss) at a frequency of 5 kHz can be 5 dB or less thanks to the high flexibility in controlling the sound permeability of the resin film 1. Depending on the configuration of the resin film 1, the sound pressure loss at a frequency of 5 kHz can be 3 dB or less, 2 dB or less, or even 1 dB or less. Additionally, for example, when the acoustic resistor has an effective area of 4.9 mm$^2$, a sound pressure loss (insertion loss) at a frequency of 7 kHz can be 5 dB or less. Depending on the configuration of the resin film 1, the sound pressure loss at a frequency of 7 kHz can be 3 dB or less, 2 dB or less, or even 1 dB or less. Furthermore, for example, when the acoustic resistor has an effective area of 4.9 mm$^2$, a sound pressure loss (insertion loss) at a frequency of 10 kHz can be 5 dB or less. Depending on the configuration of the resin film 1, the sound pressure loss at a frequency of 10 kHz can be 3 dB or less.

The larger the effective area of the acoustic resistor 58 is, the higher the sound permeability of the acoustic resistor is. However, the acoustic resistor 58 according to the present invention can have high sound permeability as described above even when its effective area is as small as 4.9 mm$^2$. This advantageous feature contributes, for example, to an increase in the flexibility in the visual appearance and design of an audio device including the acoustic resistor 58, in particular a reduction in size and/or thickness of the electronic device. The "effective area" of the acoustic resistor refers to the area of a region (effective region) of the acoustic resistor through which, when the acoustic resistor is placed to cover an opening portion, sound actually enters, travels in, and exits the acoustic resistor. For example, the effective area does not include the area of a supporting member or a bonding portion placed or formed on the peripheral portion of the acoustic resistor for attachment of the acoustic resistor. Typically, the effective area corresponds to the area of an opening portion to which the acoustic resistor is attached, or corresponds to the area of an opening portion of a supporting member when the supporting member is placed on the peripheral portion of the acoustic resistor.

The acoustic resistor 58 may include two or more resin films 1.

The acoustic resistor 58 may, if desired, include an additional member and/or layer other than the resin film 1 and the liquid-repellent layer 4. The member is, for example, an air-permeable supporting layer and/or supporting member as described above. The specific configurations of the air-permeable supporting layer and the supporting member and the manner of placement of the air-permeable supporting layer and the supporting member on the acoustic resistor can be the same as those described above for the air-permeable membrane.

The acoustic resistor with the supporting member can be handled and sold as an acoustic resistor member including an acoustic resistor and a supporting member joined to the acoustic resistor member. Examples of the configuration of the acoustic resistor member can be the same as examples of the configuration of the air-permeable membrane member such as those shown in FIGS. 5 and 6, except that the air-permeable membrane 46 is replaced by the acoustic resistor. The acoustic resistor member can enjoy the effects derived from the supporting member 47 which are described above for the air-permeable membrane member.

The acoustic resistor member may include two or more acoustic resistors and/or two or more supporting members 47.

The acoustic resistor 58 and the acoustic resistor member may be colored as described above. To this end, for example, at least one selected from the resin film 1, the air-permeable supporting layer, and the supporting member may be subjected to the coloring treatment.

When used in an audio device having a passage 57 for gas which communicates with an opening portion provided in the housing of the device and in which an acoustic element is placed, the acoustic resistor 58 (the term "acoustic resistor 58" as used hereinafter includes the acoustic resistor member) is placed between the opening portion and the acoustic element in the passage 57. Being "placed between the opening portion and the acoustic element" includes the situation where the acoustic resistor 58 is attached to the opening portion or, in particular, joined to the housing so as to cover the opening portion. In this case, the acoustic resistor 58 may be joined to the inner wall or outer wall of the housing.

The opening portion with which the passage 57 communicates may be a sound transmission port or an opening portion other than the sound transmission port. In the earphone unit 51 shown in FIG. 7, the passage 57 in which the acoustic resistor 58 is placed communicates with the opening portion 56 which is different from the sound transmission port 55. For example, the housing of the audio device may be provided with two or more opening portions including a sound transmission port for transmission of sound between the acoustic element and the outside of the housing, and the acoustic resistor 58 may be placed at least in a passage 57 that communicates at least with an opening portion other than the sound transmission port. The acoustic resistor 58 may be placed both in a passage 57 communicating with the sound transmission port and in another passage 57 communicating with an opening portion other than the sound transmission port. Two or more acoustic resistors 58 may be placed in the audio device, and the number of the acoustic resistors 58 placed in one passage 57 may be two or more.

The passage 57 extending from the acoustic element may communicate with two or more opening portions and, in this case, at least one of the two or more opening portions may be a sound transmission port. In other words, the passage 57 extending from the acoustic element may communicate both with the sound transmission port and with an opening portion other than the sound transmission port.

The design of the passage 57, the location and number of the acoustic resistors 58 to be placed in the passage 57, and the characteristics (such as the diameters of the openings of the through holes and the air permeability) of the acoustic resistors 58 can be freely adjusted depending on the desired audio device characteristics.

The acoustic resistor 58 is, for example, placed to cover a cross-section of the passage 57. The acoustic resistor 58 may be placed to cover a part of the cross-section of the passage 7.

When the acoustic resistor 58 has dustproofness, an audio device having dustproofness can be obtained depending on how the acoustic resistor 58 is placed. For example, the acoustic resistor 58 can be placed to cover an opening portion communicating with the passage 57 to achieve the dustproofness. When the acoustic resistor 58 has waterproofness, an audio device having waterproofness can be obtained depending on how the acoustic resistor 58 is placed. For example, the acoustic resistor 58 can be placed to cover an opening portion communicating with the passage 57 to achieve the waterproofness.

The way of placing the acoustic resistor 58 in the passage 57 is not limited. In the earphone unit 1 shown in FIG. 7; the acoustic resistor 58 is joined to the frame 73, which is provided with the opening 74 constituting a part of the passage 57, in such a manner as to cover the opening 74. When the acoustic resistor 58 is placed in the passage 57 by joining the resistor 58 to a component of the audio device, the joining can be done using a technique such as bonding by a double-coated adhesive tape, thermal welding, high-frequency welding, or ultrasonic welding. With the use of bonding by a double-coated adhesive tape, the double-coated adhesive tape can be exploited as a member for supporting the acoustic resistor, and the joining of the acoustic resistor 58 can be accomplished more reliably and accurately.

The shape of the acoustic resistor 58 is not limited. The shape of the acoustic resistor 58 is, for example, a disc shape, a cylindrical shape, a ring shape, or a part of any of these shapes (e.g., a shape corresponding to a part of a ring, a crescent shape, and a half-moon shape). The shape of the acoustic resistor 58 can be freely adjusted according to the shape of the passage 57 in which the acoustic resistor 58 is to be placed or the shape of the cross-section of the passage 57.

The acoustic element has the function of sending and/or receiving sound. The acoustic element is, for example, a vibration plate (a vibration film, vibration membrane, or diaphragm).

The location of the acoustic element placed in the passage 57 is not limited. For example, the acoustic element may be placed at an end of the passage 57.

The transducing part (transducer) includes the acoustic element, and performs conversion between sound and an electrical signal. When the audio device is a device such as an earphone which emits sound, the transducing part outputs sound represented by an electrical signal (sound signal) input to the transducing part. When the audio device is a device such as a microphone which receives sound, the transducing part outputs an electrical signal (sound signal) representing sound input to the transducing part. The details of the whole configuration of the transducing part including the configuration of the acoustic element are not particularly limited, and may be the same as those of known transducing parts.

The way of enclosing the transducing part in the housing, and the location of the transducing part in the housing, are not limited. The housing is formed of, for example, a metal, resin, glass, or composite thereof. The location and shape of the opening portions (including a sound transmission port) provided in the housing are not limited.

Examples of the audio device include, but are not limited to, an earphone set, a headphone set, a microphone, a headset, a telephone receiver, a hearing aid, and a wearable terminal. The audio device can be an acoustic evaluation device such as a sound level meter. The audio device can be a unit of an audio device constructed of two or more units. The unit is, for example, an earphone unit, a headphone unit, a microphone unit, or a unit of a headset.

[Method for Producing Polymer Resin Film]

The resin film 1 can be produced by the production method described hereinafter.

In the production method, the resin film 1 is produced by irradiating an original film with a laser to form through holes 12 in the original film. The resin film having the through holes 12 formed by the laser irradiation step may be used by itself as the resin film 1. Alternatively, the resin film may, if desired, be subjected to the step of formation of the liquid-repellent layer 4, the step of coloring treatment, or the step of lamination of an air-permeable supporting layer and/or supporting member, and the resulting product may be used as the resin film 1 or as a member, such as a sound-permeable membrane, which includes the resin film 1.

This method, employing laser irradiation, allows easy control of various features such as: the diameters of the openings 13 of the through holes 12 of the resin film 1; the unevenness of the diameters of the openings 13; the direction in which the through holes 12 extend; the cross-sectional shape of the through holes 12; the change in the cross-sectional shape; the arrangement of the openings 13 in the principal surfaces of the resin film 1; the porosity of the principal surfaces; and the density of the openings 13 in the principal surfaces.

The original film can be a non-porous polymer resin film having no passage that allows through-thickness air permeation in a region that is to be used as the resin film 1. The original film may be an imperforate film. When the original film is a non-porous resin film, the resin film 1 having a non-porous substrate structure can be produced.

A material identical to the material composing the resin film 1 to be obtained can be selected as the material composing the original film.

Typically, the laser irradiation for forming the through holes 12 causes no change in film thickness. Thus, the desired thickness of the resin film 1 to be obtained can be selected as the thickness of the original film.

The original film is irradiated, for example, with a focused pulsed laser. For the focused pulsed laser irradiation, a known laser and a known optical system can be used. The laser is, for example, a UV pulsed laser, and the wavelength of the laser is, for example, 355 nm, 349 nm, or 266 nm (corresponding to the wavelength of high-order harmonics of a solid-state laser using Nd:YAG, Nd:YLF, or $YVO_4$ as a medium) or is 351 nm, 248 nm, 222 nm, 193 nm, or 157 nm (corresponding to the wavelength of an excimer laser). A laser emitting light with a wavelength outside the UV range may be used, as long as the through holes 12 can be formed in the original film. The pulse width of the laser used is not limited either as long as the through holes 12 can be formed. For example, a pulsed laser with a pulse width on the order of femtoseconds or picoseconds can be used. With the use of such a pulsed laser, the through holes 12 are formed by ablation due to multiphoton absorption. The spatial intensity distribution of the laser beam may be a Gaussian distribution in which the central intensity is high or may be a top-hat distribution in which the intensity is uniform.

The optical system includes, for example, a galvano scanner and a Fθ lens (condensing lens). The Fθ lens is preferably selected and placed in the optical system so that the telecentricity is within 5 degrees. The optical system can include a polygon mirror scanner. The use of the optical system including these scanners makes it easier to form the through holes 12 at the desired locations in the original film.

In the laser irradiation of the original film, a measure may be taken to prevent matter produced by decomposition of the original film from adhering to the optical system and/or the film. Examples of the preventive measure include: blowing an assist gas onto the portion to be processed or onto the vicinity of the portion; and sucking the portion to be processed or the vicinity of the portion. As the assist gas there can be used, for example, an inert gas such as nitrogen, air, or oxygen. The gas blowing and the suction may be carried out together.

In view of the formation of the through holes 12 by laser irradiation, the thickness of the original film is preferably 5 µm or more and 50 µm or less. When the thickness of the original film is within this range, the formation of the through holes 12 by laser irradiation can be accomplished more efficiently.

The laser irradiation of the original film may be carried out as follows: the original film cut into a given size is irradiated with a laser, with the original film being fixed or with the original film being moved; or the original film prepared in the form of a long sheet is irradiated with a laser, with the original film being moved. It is also conceivable to wind the original film in the form of a long sheet onto a roll, feed the original film from the roll, irradiating the moving original film in the form of a long sheet with a laser, and wind the laser-irradiated film on another roll. That is, the laser irradiation of the original film in the form of a long sheet may be performed by a roll-to-roll process.

In view of efficient removal of laser irradiation-produced decomposition residue of the material composing the original film, the laser irradiation of the original film may be carried out in such a manner that the original film held in midair is irradiated with a laser. In this case, a suction mechanism for efficiently collecting and removing decomposed matter may, if desired, be placed facing the back surface (the surface opposite to that surface to be irradiated with a laser) of the original film.

During the laser irradiation of the original film, a certain tension is preferably applied to that portion of the original film which is to be irradiated with a laser. By so doing, the occurrence of defects caused by wrinkling or slacking of the original film during the laser irradiation can be reduced. The application of a certain tension can be done, for example, by pinching and/or holding both edges of the original film.

After the formation of the through holes 12 by the laser irradiation of the original film, the laser-irradiated film may, if desired, be cleaned to remove matter adhering to the film, such as decomposition residue of the material composing the original film. The method for cleaning is not limited, and can be selected, for example, from wet cleaning by water immersion, showering, and/or ultrasonication and dry cleaning using a plasma, UV ozone, ultrasonic wave, brush, and/or adhesive tape. When the wet cleaning is employed, a drying step may be added if desired.

The original film may be subjected to a coloring treatment as described above. In this case, the resin film 1 is produced as a colored film.

The method for producing a resin film according to the present invention may include a step other than those described above.

The method for producing a resin film according to the present invention is applicable also as a method for producing a member in which the resin film is used; for example, the method for producing a resin film according to the present invention is applicable as a method for producing an air-permeable membrane, an air-permeable membrane member, a sound-permeable membrane, a sound-permeable membrane member, an acoustic resistor, or an acoustic resistor member, the method including irradiating an original film with a laser to form through holes in the original film.

EXAMPLES

Hereinafter, the present invention will be described in more details with examples. The present invention is not limited to the examples presented below.

Example 1: Evaluation of Relationship Between Porosity and Through-Thickness Air Permeability of Resin Film Imperforate original films ("Lumirror", manufactured by Toray Industries Inc. and having a thickness of 12 µm or 25 µm) made of PET were irradiated with a pulsed laser (wavelength=355 nm, pulse width=20 nanoseconds, output power=7.6 W, repetition frequency=40 kHz) in conjunction with scanning by a galvano scanner and focusing by a Fθ lens (focal length=100 mm). Through holes 12 were thus formed in the original films to obtain resin films 1.

The through holes 12 formed in Example 1 included: through holes 12 having a shape in which the area of a cross-section perpendicular to the direction in which they extend continuously increases from the first principal surface 2 of the film toward the second principal surface 3 of the film; and through holes 12 having a shape in which the area of a cross-section perpendicular to the direction in which they extend is constant from the first principal surface 2 of the film to the second principal surface 3 of the film. In the formation of the former through holes 12, the diameter of the smaller openings 13a in the first principal surface 2 and the diameter of the larger openings 13b in the second principal surface 3 were varied as shown in Table 1 below by changing the thickness of the original film and controlling the beam diameter of the laser incident on the galvano scanner. For the through holes 2 having a shape in which the area of a cross-section perpendicular to the direction in which they extend is constant from the first principal surface 2 of the film to the second principal surface 3 of the film, the diameter of the openings 13a in the principal surface 2 and the diameter of the openings 13b in the principal surface 3 were equal. Additionally, the intervals between the adjacent through holes 12 (the distances between the centers of the holes) in the MD and TD directions of the film were varied as shown in Table 1 below by controlling the scanning speed of the galvano scanner. In Example 1, when the interval in the MD direction and the interval in the TD direction are equal, this means that the openings 13 of the through holes 12 were formed at positions corresponding to intersections of an imaginary square grid defined on the principal surfaces of the film. When the interval in the MD direction and the interval in the TD direction are different, this means that the openings 13 of the through holes 12 were formed at positions corresponding to intersections of an imaginary rectangular grid defined on the principal surfaces of the film.

For the resin films 1 produced as described above, the diameters of the openings 13 of the through holes 12 in the principal surfaces 2 and 3, the porosity of the first principal surface 2, and the through-thickness air permeability were evaluated. The evaluation of the diameters of the openings 13 and the evaluation of the porosity of the first principal surface 2 were made as previously described. The evaluation of the through-thickness air permeability was made as follows.

[Air Permeability]

The through-thickness air permeability of each resin film was determined by measuring a Gurley number according to Method B (Gurley method) of air permeability testing specified in JIS L 1096 and converting the Gurley number to a Frazier number. The following is the equation used for converting the Gurley number G to the Frazier number F in the air permeability determination.

$$F = 1.57/G$$

The evaluation results are shown in Table 1 given below and in FIG. 8. The unit of the Frazier number is cm³/(cm²·sec).

TABLE 1

| No. | Thickness of original film (μm) | Diameters of openings (μm) Principal surface 2 | Diameters of openings (μm) Principal surface 3 | Intervals between openings (μm) MD | Intervals between openings (μm) TD | Porosity of principal surface 2 (%) | Frazier number |
|---|---|---|---|---|---|---|---|
| 1  | 12 | 18 | 18 | 50  | 100 | 5.1  | 7.2  |
| 2  | 25 | 17 | 25 | 100 | 100 | 2.3  | 3.9  |
| 3  | 25 | 13 | 19 | 50  | 50  | 5.3  | 9.1  |
| 4  | 12 | 17 | 19 | 40  | 50  | 11.3 | 30.8 |
| 5  | 25 | 14 | 31 | 55  | 55  | 5.1  | 9.7  |
| 6  | 12 | 29 | 30 | 60  | 60  | 18.3 | 64.5 |
| 7  | 12 | 29 | 30 | 55  | 55  | 21.8 | 90   |
| 8  | 12 | 29 | 30 | 55  | 55  | 21.8 | 86   |
| 9  | 12 | 29 | 30 | 75  | 75  | 11.7 | 35   |
| 10 | 12 | 29 | 30 | 100 | 100 | 6.6  | 17   |
| 11 | 25 | 14 | 31 | 55  | 55  | 5.1  | 10.5 |
| 12 | 25 | 14 | 31 | 75  | 75  | 2.7  | 4.5  |
| 13 | 25 | 14 | 31 | 100 | 100 | 1.5  | 0.8  |
| 14 | 25 | 23 | 26 | 55  | 55  | 13.7 | 36.8 |
| 15 | 25 | 19 | 27 | 50  | 50  | 11.3 | 27.1 |
| 16 | 12 | 23 | 26 | 50  | 50  | 16.6 | 54.3 |
| 17 | 12 | 23 | 26 | 45  | 45  | 20.5 | 89   |

Figure 8:
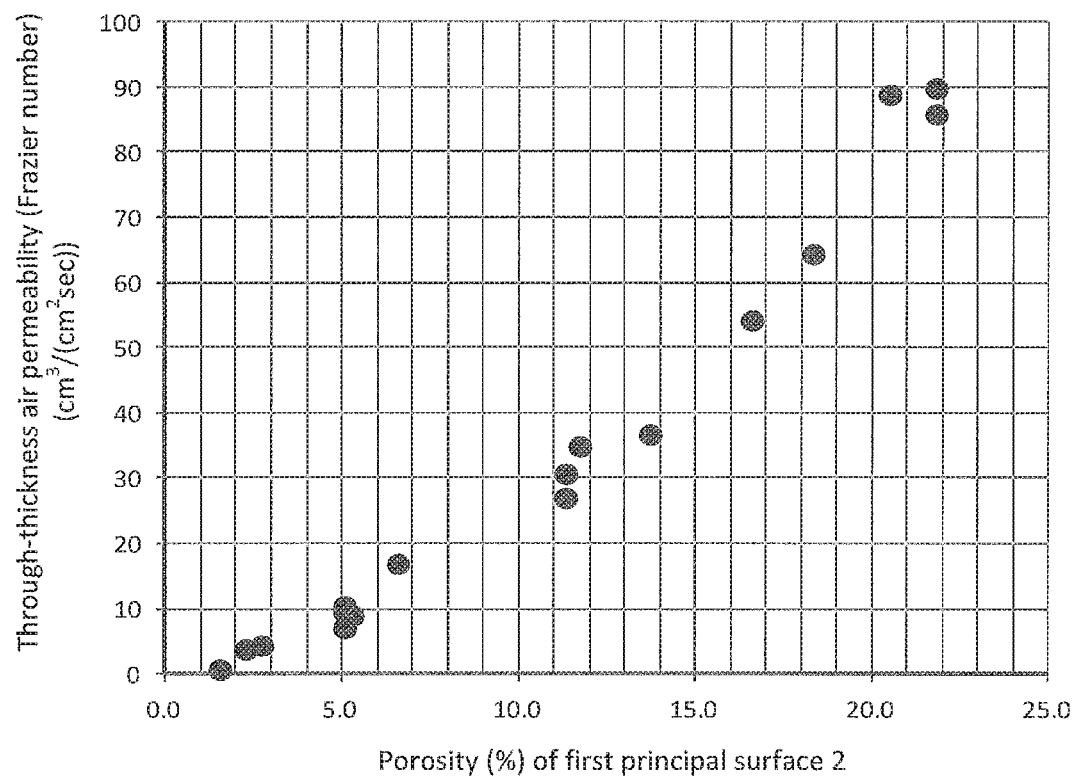
FIG. 8 is a graph showing the relationship between the porosity of the first principal surface and the through-thickness air permeability, as observed for resin films according to the present invention in Example 1.

As shown in Table 1 and FIG. 8, the relationship between the porosity of the principal surface 2 and the through-thickness air permeability of the resin film 1 was approximately linear irrespective of the thickness of the original film (or the thickness of the produced resin film) and the diameter of the openings 13a.

Example 2: Evaluation of Air Permeability Variation

Figure 9:
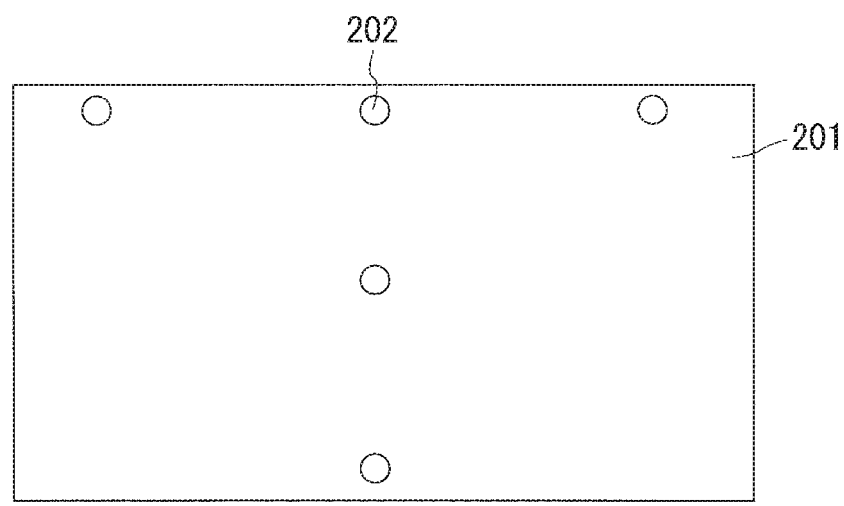
FIG. 9 is a diagram illustrating measurement points set on a sample in measurement performed in Examples to determine the air permeability variation of resin films.

For a resin film fabricated in the same manner as in Example 1 (it should be noted that the diameter of the openings 13a of the through holes 12 in the first principal surface 2 was 8 μm, the diameter of the openings 13b of the through holes 12 in the second principal surface 3 was 21 μm, the porosity of the first principal surface 2 was 0.5%, the density of the openings 13a in the first principal surface 2 was 1×10⁴ openings/cm², and the thickness of the original film and the fabricated resin film was 25 μm), the unevenness of the air permeability within the first principal surface 2 was evaluated by a variation in air permeability (air permeability variation). The air permeability variation was determined as follows. First, as shown in FIG. 9, a sample 201 was cut out from the fabricated resin film, and a total of five measurement points 202 were set on a principal surface of the sample in such a manner that three measurement points 202 were aligned in each of the two orthogonal directions. Next, the through-thickness air permeability of the sample 201 was measured as a Gurley number according to JIS L 1096 B at each measurement point 202, and the Gurley number was converted to a Frazier number as in Example 1. This permeability determination was performed for six samples 201 individually cut out from one and the same resin film, and the average Av and the standard deviation σ of the 30 (five measurement points×six samples) measured values of the air permeability (Frazier number) were determined. The air permeability variation was determined as the ratio of the standard deviation σ to the average Av (σ/Av). The air permeability variation of the resin film fabricated in Example 2 was 4.55%.

Example 3: Evaluation of Sound Permeability

For the resin film samples Nos. 2, 5, 12, 13, and 14 fabricated in Example 1 (all of these samples had a thickness of 25 μm) and the resin film samples Nos. 1, 4, 8, 9, and 16 fabricated in Example 1 (all of these samples had a thickness of 12 μm), the sound permeability (sound pressure loss) was evaluated as follows.

[Sound Permeability (Sound Pressure Loss)]

Figure 10A:
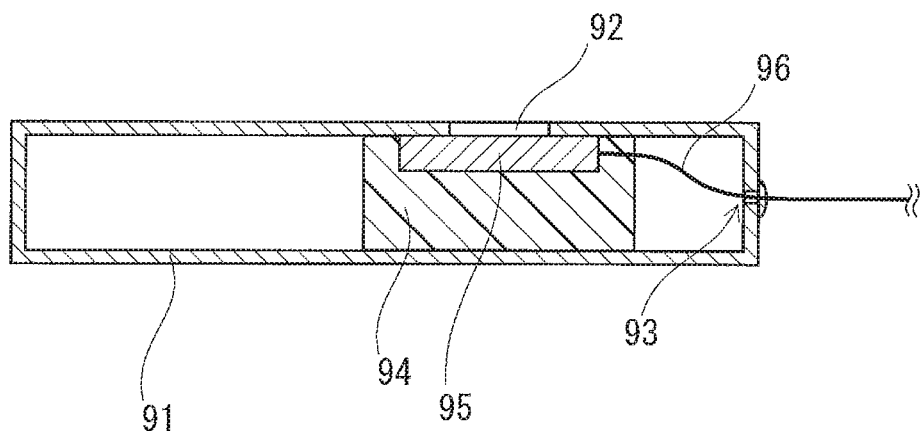
FIG. 10A is a cross-sectional view schematically showing: a simulated housing used for evaluation of insertion loss of resin films in Examples; and how a speaker is placed in the housing.

First, as shown in FIG. 10A, a simulated housing 91 (made of polystyrene and having outer dimensions of 60 mm×50 mm×28 mm) imitating a housing of a mobile phone was prepared. The simulated housing 91 was provided with: one speaker attachment hole 92 (having the shape of a circle of 2.5 mm diameter) serving as an opening portion for allowing sound output from a speaker to be transmitted to the outside of the housing; and one guide hole 93 for a speaker cable. The housing had no opening portions other than these holes. Next, a speaker 95 (SCG-16A, manufactured by Star Micronics Co., Ltd) was embedded in a filler 94 made of urethane sponge and having formed therein a sound transmission port having the shape of a circle of 5 mm diameter, and the filler 94 with the speaker 95 was placed inside the housing 91. The speaker cable 96 of the speaker 95 was led to the outside of the housing 91 through the guide hole 93, and then the guide hole 93 was filled with putty.

Figure 10B:
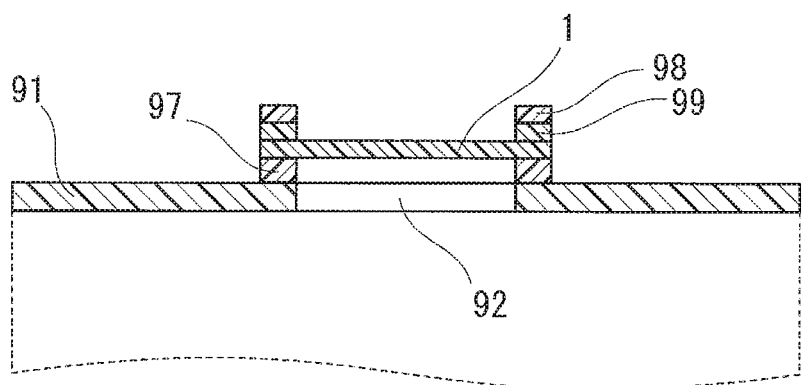
FIG. 10B is a cross-sectional view schematically showing: a specimen prepared for evaluation of insertion loss of resin films in Examples; and a state where the specimen is attached to a simulated housing.

Next, a double-coated adhesive tape 97 (No. 57120B, manufactured by Nitto Denko Corporation and having a thickness of 0.2 mm) made of a polyethylene foam, a PET film 98 (having a thickness of 0.1 mm), and a double-coated adhesive tape 99 (No. 5603, manufactured by Nitto Denko Corporation and having a thickness of 0.03 mm) made of PET were prepared. A ring-shaped piece having an inner diameter of 2.5 mm and an outer diameter of 5.8 mm was punched from each of the prepared tapes and film. Additionally, a circular piece having a diameter of 5.8 mm was punched from each of the numbered samples of the resin film 1. Next, the ring-shaped piece of the double-coated adhesive tape 97 having an inner diameter of 2.5 mm, the circular piece of the resin film 1, the ring-shaped piece of the double-coated adhesive tape 99 having an inner diameter of 2.5 mm, and the ring-shaped piece of the PET film 98 having an inner diameter of 2.5 mm were stacked in this order in such a manner that their entire outer peripheries exactly overlapped each other. Thus, specimens (in which the resin film 1 had an effective area of 4.9 mm$^2$) for acoustic characteristics evaluation were prepared (see FIG. 10B).

Next, each of the specimens prepared as described above was attached to the exterior of the simulated housing 91 by means of the polyethylene foam double-coated adhesive tape 97 of the specimen so that the resin film 1 fully covered the opening portion 92. This was done in such a manner that no gap was formed between the resin film 1 and the double-coated adhesive tape 97 and between the double-coated adhesive tape 97 and the simulated housing 91.

Next, the speaker cable 96 and a microphone (Spm0405Hd4H-W8 manufactured by Knowles Acoustic) were connected to an acoustic evaluation system (Multi-analyzer System 3560-B-030 manufactured by B&K Sound & Vibration Measurement A/S), and the microphone was placed at a distance of 21 mm from the opening portion 92 of the simulated housing 91. Then, SSR analysis (test signals of 20 Hz to 10 kHz, sweep) was selected as an evaluation mode and carried out to evaluate the acoustic characteristics (THD and sound pressure loss) of the resin film 1. The sound pressure loss was automatically determined on the basis of the signal input to the speaker 95 from the acoustic evaluation system and the signal detected through the microphone. Additionally, a blank sound pressure loss was determined in the same manner except for the absence of the resin film 1, and a value obtained by subtracting the blank sound pressure loss from the sound pressure loss determined in the presence of the resin film 1 was determined as the sound pressure loss (insertion loss) used as an index of the acoustic quality of the film. A smaller insertion loss can be considered to indicate better maintenance of the characteristics of sound transmitted through the resin film 1.

Figure 11:
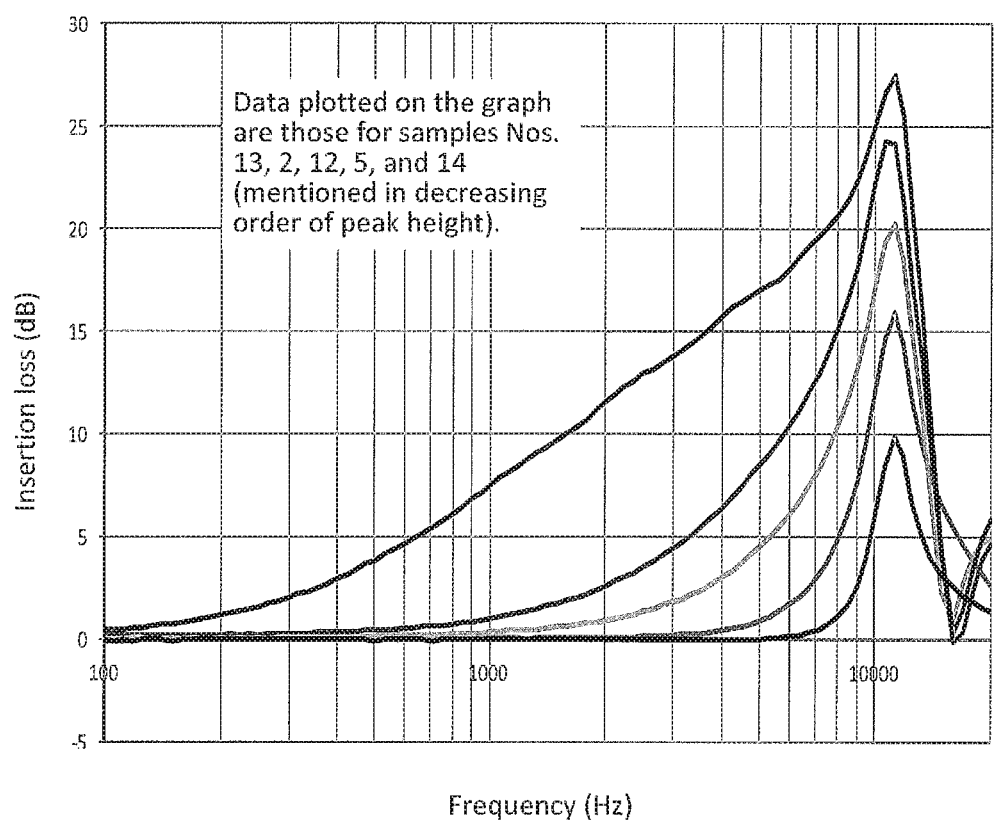
FIG. 11 is a graph showing the results of evaluation of insertion loss of resin films (thickness: 25 μm) in Example 3.
Figure 12:
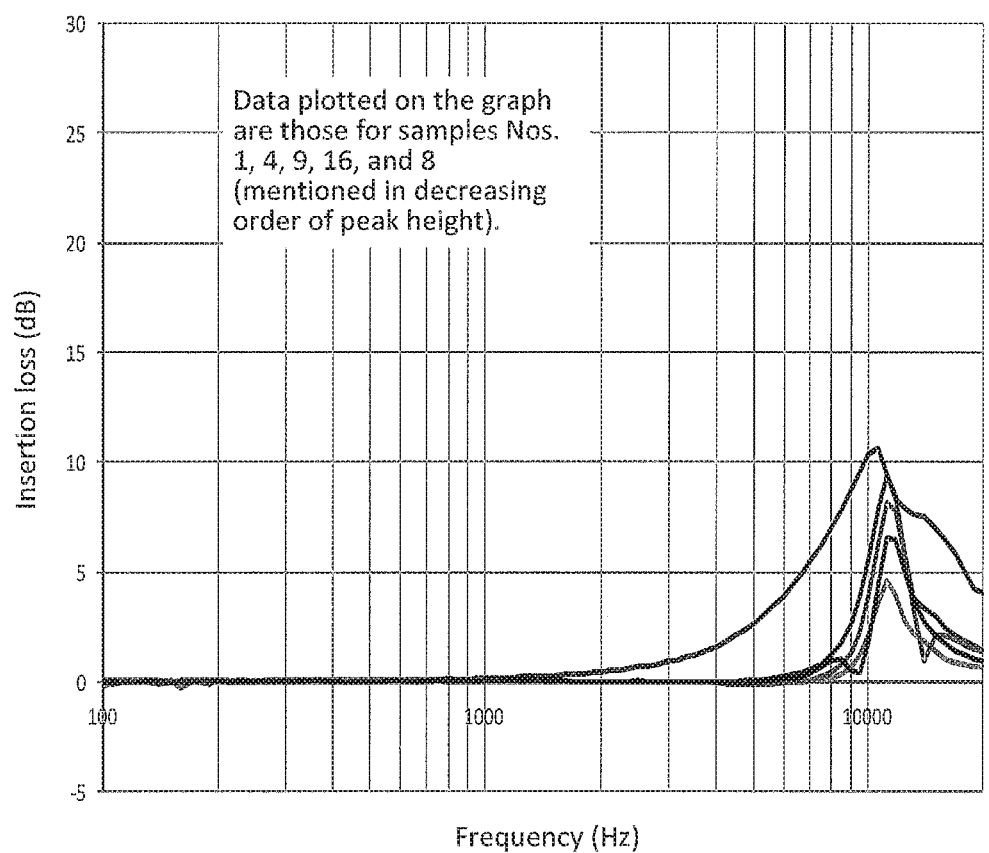
FIG. 12 is a graph showing the results of evaluation of insertion loss of resin films (thickness: 12 μm) in Example 3.

The evaluation results are shown in FIGS. 11 and 12.

As shown in FIG. 11, when the thickness of the resin film 1 was 25 μm, an insertion loss of 20 dB or less was achieved at a frequency of 5 kHz. Samples Nos. 2, 12, 5, and 14, for which the Frazier number was 1 cm$^3$/(cm$^2$·sec) or more, yielded an insertion loss of 10 dB or less at a frequency of 5 kHz. Samples Nos. 12, 5, and 14, for which the Frazier number was 4 cm$^3$/(cm$^2$·sec) or more, yielded an insertion loss of 5 dB or less at a frequency of 5 kHz.

As shown in FIG. 12, when the thickness of the resin film 1 was 12 μm, an insertion loss of 5 dB or less was achieved at frequencies of 5 kHz and 7 kHz for all of the samples. Samples Nos. 4, 9, 16, and 8, for which the Frazier number was 10 cm$^3$/(cm$^2$·sec) or more, yielded an insertion loss of 1 dB or less at frequencies of 5 kHz and 7 kHz.

Comparative Example 1

A commercially-available non-woven fabric (Smash Y15250, manufactured by Asahi Kasei Fibers Corporation) was prepared as Comparative Example 1. This non-woven fabric is made up of polyethylene terephthalate fibers formed by spunbonding and had an apparent density of 0.44 g/cm$^3$.

For this non-woven fabric, the air permeability variation was determined in the same manner as in Example 2. The locations of the measurement points 202 were identical to those in Example 2. The air permeability variation of the non-woven fabric of Comparative Example 1 was 18.0%.

Example 4: Evaluation of Water Entry Pressure

Resin films having through holes 12 were obtained in the same manner as in Example 1, except that the thickness of the original film was standardized to 25 μm and the focal length of the Fθ lens was changed to 163 mm. The through holes 12 formed in Example 3 had a shape in which the area of a cross-section perpendicular to the direction in which the through holes 12 extend continuously increases from the first principal surface 2 of the film toward the second principal surface 3 of the film. In the formation of the through holes 12, the diameter of the smaller openings 13a in the first principal surface 2 and the diameter of the larger openings 13b in the second principal surface 3 were varied as shown in Table 2 below by controlling the beam diameter of the laser incident on the galvano scanner. Additionally, the intervals between the adjacent through holes 12 (the distances between the centers of the holes) in the MD and TD directions of the film were varied as shown in Table 2 below by controlling the scanning speed of the galvano scanner.

Next, each of the resin films produced as described above was immersed in a liquid-repellent treatment solution for 5 seconds and then left to dry at ordinary temperature for 30 minutes to form a liquid-repellent layer over the surfaces of the film and the inner peripheral surfaces of the through holes 12. Thus, liquid-repellent resin films 1 were obtained. The liquid-repellent treatment solution used was prepared by diluting a liquid-repellent agent (X-70-043, manufactured by Shin-Etsu Chemical Co., Ltd.) with a diluent (FS thinner, manufactured by Shin-Etsu Chemical Co., Ltd.) to a concentration of 1.0 wt %.

For the resin films 1 thus produced, the diameters of the openings 13 of the through holes 12 in the principal surfaces 2 and 3, the porosity of the first principal surface 2, and the through-thickness air permeability (Frazier number) were evaluated in the same manner as in Example 1. Additionally, the air permeability variation was evaluated in the same manner as in Example 2, and the density of the openings a in the first principal surface 2 was evaluated as previously described. The water entry pressure of the produced resin films 1 was evaluated as follows.

[Water Entry Pressure]

As in the sound permeability evaluation, a double-coated adhesive tape 97 (No. 57120B, manufactured by Nitto Denko Corporation and having a thickness of 0.2 mm) made of a polyethylene foam, a PET film 98 (having a thickness of 0.1 mm), and a double-coated adhesive tape 99 (No. 5603, manufactured by Nitto Denko Corporation and having a thickness of 0.03 mm) made of PET were prepared. A ring-shaped piece having an inner diameter of 2.5 mm and an outer diameter of 5.8 mm was punched from each of the prepared tapes and film. Additionally, a circular piece having a diameter of 5.8 mm was punched from each of the numbered samples of the resin film 1. Next, the ring-shaped piece of the double-coated adhesive tape 97 having an inner diameter of 2.5 mm, the circular piece of the resin film 1, the ring-shaped piece of the double-coated adhesive tape 99 having an inner diameter of 2.5 mm, and the ring-shaped piece of the PET film 98 having an inner diameter of 2.5 mm were stacked in this order in such a manner that their entire outer peripheries exactly overlapped each other. Thus, specimens (in which the resin film 1 had an effective area of 4.9 mm$^2$) for water entry pressure evaluation were prepared.

Next, each of the specimens prepared as described above was bonded to a fixing jig having a 2.0-mm-diameter opening at its center in such a manner that the center of the specimen and the center of the opening coincided with each other. After that, the fixing jig with the specimen was set in a water penetration testing apparatus, and the water entry pressure of the resin film 1 was evaluated according to Method B (high hydraulic pressure method) of water penetration test specified in JIS L 1092.

The evaluation results are collectively shown in Table 2.

Example 5

Resin films having through holes 12 were obtained in the same manner as in Example 1, except that the thickness of the original film was standardized to 12 μm, the output power of the pulsed laser was changed to 1.9 W, and the repetition frequency of the pulsed laser was changed to 10 kHz. The through holes 12 formed in Example 5 had a shape in which the area of a cross-section perpendicular to the direction in which the through holes 12 extend continuously

TABLE 2

| No. | Thickness of original film (μm) | Diameters of openings (μm) Principal surface 2 | Diameters of openings (μm) Principal surface 3 | Intervals between openings (μm) MD | Intervals between openings (μm) TD | Porosity of principal surface 2 (%) | Water entry pressure (kPa) | Frazier number |
|---|---|---|---|---|---|---|---|---|
| 18 | 25 | 14.2 | 33 | 50 | 50 | 6.3 | 6 | 18.8 |
| 19 | 25 | 13.8 | 25 | 65 | 65 | 3.5 | 9 | 8.8 |
| 20 | 25 | 13.1 | 25 | 75 | 75 | 2.4 | 9 | 5.6 |
| 21 | 25 | 7.2 | 22 | 70 | 70 | 0.8 | 11 | 1.2 |

As shown in Table 2, high waterproofness corresponding to a water entry pressure of 6 kPa or more was achieved when the diameter of the openings 13a in the first principal surface 2 was 15 μm or less, and higher waterproofness corresponding to a water entry pressure of 9 kPa or more was achieved when the diameter of the openings 13a was 14 μm or less. For all of the resin film samples Nos. 18 to 21 fabricated in Example 3, the variation in the density of the openings 13a in the first principal surface 2 was 100 openings/cm$^2$ or less, and the air permeability variation was 8% or less. For the resin films fabricated in Example 4, the relationship between the porosity of the principal surface 2 and the through-thickness air permeability of the resin film 1 was approximately linear irrespective of the diameter of the openings 13a, as is the case for the resin films fabricated in Example 1.

Besides, another resin film 1 was fabricated in the same manner as above except for omitting the liquid-repellent treatment. In this resin film 1, the diameters of the openings, the intervals between the openings, the porosity of the principal surface 2, and the Frazier number were the same as those in sample No. 21. The water entry pressure of the fabricated film was evaluated to be 2 kPa.

increases from the first principal surface 2 of the film toward the second principal surface 3 of the film. In the formation of the through holes 12, the diameter of the smaller openings 13a in the first principal surface 2 and the diameter of the larger openings 13b in the second principal surface 3 were varied as shown in Table 3 below by adjusting the positional relationship between the original film and the Fθ lens and controlling the beam diameter of the laser incident on the galvano scanner. Additionally, the intervals between the adjacent through holes 12 (the distances between the centers of the holes) in the MD and TD directions of the film were varied as shown in Table 3 below by controlling the scanning speed of the galvano scanner.

For the resin films 1 produced as described above, the diameters of the openings 13 of the through holes 12 in the principal surfaces 2 and 3, the porosity of the first principal surface 2, the density of the openings 13a in the first principal surface 2, and the through-thickness air permeability (Frazier number) were evaluated in the same manner as in Example 1. Additionally, the air permeability variation was evaluated in the same manner as in Example 2, and the sound permeability was evaluated in the same manner as in Example 3. The variation in the density of the openings in the first principal surface 2 was also evaluated as previously described.

TABLE 3

| No. | Thickness of original film (μm) | Diameters of openings (μm) Principal surface 2 | Diameters of openings (μm) Principal surface 3 | Interval between openings (μm) MD | Interval between openings (μm) TD | Porosity of principal surface 2 (%) | Density of openings 13 (openings/cm$^2$) | Frazier number |
|---|---|---|---|---|---|---|---|---|
| 22 | 12 | 75 | 77 | 250 | 250 | 7.1 | $1.6 \times 10^3$ | 18.0 |
| 23 | 12 | 70 | 72 | 300 | 300 | 4.3 | $1.1 \times 10^3$ | 10.0 |
| 24 | 12 | 60 | 63 | 300 | 300 | 3.1 | $1.1 \times 10^3$ | 8.0 |

Still another resin film 1 (subjected to the liquid-repellent treatment) was produced in the same manner as above. In this resin film, the diameter of the openings 13a in the first principal surface 2 was 18 μm, and the interval between the openings was 70 μm in both of the MD and TD directions. The water entry pressure of the produced resin film was evaluated to be 2 kPa.

For all of the resin film samples Nos. 22 to 24, the variation in the density of the openings 13a in the first principal surface 2 was 100 openings/cm$^2$ or less, and the air permeability variation was 7% or less. Additionally, the resin film samples Nos. 22 to 24 yielded a sound pressure loss (insertion loss) of 5 dB or less at a frequency of 5 kHz when the effective area was 4.9 mm$^2$. In the resin films fabricated in Example 5, the relationship between the porosity of the principal surface 2 and the through-thickness air permeability of the resin film 1 was approximately linear irrespective of the diameter of the openings 13a, as is the case for the resin films fabricated in Example 1.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The polymer resin film according to the present invention can be used in various applications, such as in an air-permeable membrane, a sound-permeable membrane, and an acoustic resistor.

The invention claimed is:

1. A polymer resin film having a plurality of through holes extending through the thickness of the polymer resin film, wherein
the through holes penetrate a substrate structure of the resin film,
the through holes have openings formed in both a first principal surface and a second principal surface of the film,
the through holes have a shape in which the area of a cross-section perpendicular to a direction in which the through holes extend is constant from the first principal surface of the film to the second principal surface of the film or increases from the first principal surface toward the second principal surface,
the openings in the first principal surface have a diameter of 10 μm or more and 80 μm or less,
a variation in a porosity defined by the openings in the first principal surface is 0.1 or less, and
a variation in the density of the openings in the first principal surface is 1000 openings/cm² or less;
wherein the variation in the porosity and the variation in the density of the openings are defined respectively as a ratio of a standard deviation of the porosity over an average of the porosity, and as a ratio of a standard deviation of the density of the openings over an average of the density of the openings.

2. The polymer resin film according to claim 1, wherein the openings are formed independently of each other and spaced from each other in both of the principal surfaces.

3. The polymer resin film according to claim 1, wherein the substrate structure of the polymer resin film is non-porous.

4. The polymer resin film according to claim 1, wherein an air permeability through the thickness of the polymer resin film is 1 cm³/(cm²·sec) or more and 150 cm³/(cm²·sec) or less in terms of Frazier number measured according to JIS L 1096.

5. The polymer resin film according to claim 1, wherein a variation in the air permeability through the thickness of the polymer resin film is 8% or less.

6. The polymer resin film according to claim 1, wherein a sound pressure loss at a frequency of 5 kHz is 5 dB or less when the polymer resin film has an effective area of 4.9 mm².

7. The polymer resin film according to claim 1, wherein the porosity of the first principal surface is 0.5 to 50%.

8. The polymer resin film according to claim 1, wherein, in both of the principal surfaces, the openings of the through holes are formed at positions corresponding to intersections of an imaginary grid defined on each of the principal surfaces.

9. The polymer resin film according to claim 1, wherein the polymer resin film is subjected to a liquid-repellent treatment.

10. An air-permeable membrane comprising the polymer resin film according to claim 1.

11. An air-permeable membrane member comprising the air-permeable membrane according to claim 10 and a supporting member joined to the air-permeable membrane.

12. A sound-permeable membrane comprising the polymer resin film according to claim 1.

13. A sound-permeable membrane member comprising the sound-permeable membrane according to claim 12 and a supporting member joined to the sound-permeable membrane.

14. An acoustic resistor comprising the polymer resin film according to claim 1.

15. An acoustic resistor member comprising the acoustic resistor according to claim 14 and a supporting member joined to the acoustic resistor.

16. An audio device comprising the acoustic resistor according to claim 14, the audio device being an earphone set, an earphone unit, a headphone set, a headphone unit, a headset, a headset unit, a telephone receiver, a hearing aid, or a wearable terminal.

17. A method for producing the polymer resin film according to claim 1, the method comprising irradiating an original film with a laser to form the through holes in the original film.

* * * * *